US011815607B2

(12) United States Patent
Cookman et al.

(10) Patent No.: US 11,815,607 B2
(45) Date of Patent: Nov. 14, 2023

(54) GLOBAL NAVIGATION SATELLITE SYSTEM (GNSS) RECEIVER OPERATION DURING SPOOFING

(71) Applicant: QUALCOMM Incorporated, San Diego, CA (US)

(72) Inventors: Jordan Cookman, San Jose, CA (US); Krishnaranjan Rao, Sunnyvale, CA (US); Jeffrey Wong, Saratoga, CA (US); David Tuck, San Juan Capistrano, CA (US)

(73) Assignee: QUALCOMM Incorporated, San Diego, CA (US)

( * ) Notice: Subject to any disclaimer, the term of this patent is extended or adjusted under 35 U.S.C. 154(b) by 23 days.

(21) Appl. No.: 17/389,028

(22) Filed: Jul. 29, 2021

(65) Prior Publication Data

US 2022/0035044 A1 Feb. 3, 2022

Related U.S. Application Data

(60) Provisional application No. 63/059,104, filed on Jul. 30, 2020.

(51) Int. Cl.
*G01S 19/21* (2010.01)
*G01S 19/42* (2010.01)
*G01S 19/24* (2010.01)

(52) U.S. Cl.
CPC ............ *G01S 19/215* (2013.01); *G01S 19/42* (2013.01); *G01S 19/243* (2013.01)

(58) Field of Classification Search
CPC ....... G01S 19/215; G01S 19/243; G01S 19/42
(Continued)

(56) References Cited

U.S. PATENT DOCUMENTS 7,250,903 B1 * 7/2007 McDowell ............. H04K 3/228
342/357.59
7,940,213 B2 5/2011 Harper et al.
(Continued)

FOREIGN PATENT DOCUMENTS

DE 102018220793 6/2020
EP 2924662 9/2015
(Continued)

OTHER PUBLICATIONS

International Search Report and Written Opinion—PCT/US2021/043840—ISA/EPO—dated Nov. 16, 2021.

*Primary Examiner* — Chuong P Nguyen
(74) *Attorney, Agent, or Firm* — Weaver Austin Villeneuve & Sampson LLP

(57) ABSTRACT

In conditions in which Global Navigation Satellite System (GNSS) signal spoofing is likely occurring, a GNSS receiver may be operated in a reduced operational state with respect to one or more GNSS bands that are likely being spoofed. According to embodiments, a reduced operational state with regard to a GNSS band may comprise performing one or more of the following functions with respect to that GNSS band: disabling data demodulation and decoding, disabling time setting (e.g., time of week (TOW), week number, etc.) disabling acquisition of unknown/not visible satellites, disabling satellite differences, disabling error recovery, reducing non-coherent integration time, and duty cycling the power for one or more receiver blocks associated with the GNSS band.

24 Claims, 8 Drawing Sheets

(58) Field of Classification Search
USPC .................. 342/352, 357.25, 357.63, 357.59
See application file for complete search history.

(56) References Cited

U.S. PATENT DOCUMENTS

| | | |
|---|---|---|
| 9,185,516 B2 | 11/2015 | Fischer et al. |
| 10,466,700 B1 | 11/2019 | Carmack et al. |
| 11,163,068 B2 * | 11/2021 | Balog .................... G01S 19/215 |
| 2016/0223678 A1 | 8/2016 | Kim et al. |
| 2017/0070971 A1 | 3/2017 | Wietfeldt et al. |
| 2019/0154839 A1 * | 5/2019 | Ashjaee .................. G01S 19/42 |
| 2019/0377094 A1 | 12/2019 | Lentz et al. |
| 2021/0088672 A1 * | 3/2021 | Balog .................... G01S 19/215 |
| 2021/0109228 A1 * | 4/2021 | Rautalin ................. G01S 19/27 |
| 2021/0333410 A1 * | 10/2021 | Gum .................... G01S 19/215 |
| 2021/0333411 A1 * | 10/2021 | Gum .................... G01S 19/48 |
| 2021/0405213 A1 * | 12/2021 | Tuck .................... G01S 19/396 |
| 2022/0021702 A1 * | 1/2022 | Bouthemy .......... H04W 12/104 |
| 2022/0221587 A1 * | 7/2022 | Tuck ....................... G01S 19/03 |
| 2022/0338014 A1 | 10/2022 | Luomi et al. |
| 2022/0350030 A1 | 11/2022 | Shuman et al. |
| 2022/0353688 A1 | 11/2022 | Shuman et al. |
| 2022/0357460 A1 | 11/2022 | Schmidt Diaz et al. |

FOREIGN PATENT DOCUMENTS

| | | | |
|---|---|---|---|
| EP | 2930536 | 10/2015 | |
| JP | 2008510138 A | 4/2008 | |
| WO | WO-2021091414 A1 * | 5/2021 | ............. G01S 19/13 |

* cited by examiner

GLOBAL NAVIGATION SATELLITE SYSTEM (GNSS) RECEIVER OPERATION DURING SPOOFING

RELATED APPLICATIONS

This application claims the benefit of U.S. Provisional Application No. 63/059,104, filed Jul. 30, 2020, entitled "SYSTEMS AND METHODS FOR DETECTING AND MITIGATING SPOOFED SATELLITE NAVIGATION SIGNALS", which is assigned to the assignee hereof, and incorporated herein in its entirety by reference.

BACKGROUND

Modern electronic devices frequently include systems that can receive signals from satellite navigation systems, commonly referred to as Global Navigation Satellite Systems (each a GNSS), and use those signals to determine the location of the device, as well as other information such as speed, heading, altitude, etc. Such GNSS receivers may be integrated into consumer electronic devices, such as smartphones or smartwatches, as well as into navigation systems in different types of vehicles, including cars, trucks, ships, and aircraft. Signals are received by GNSS receivers from multiple satellites orbiting the Earth and processed to determine the GNSS receiver's location and, by proxy, the location of the device, vehicle, etc. However, some devices (referred to herein as "spoofers") may mimic or "spoof" GNSS signals.

BRIEF SUMMARY

An example method for operating a Global Navigation Satellite System (GNSS) receiver, according to this disclosure, may comprise operating the GNSS receiver in a first state with respect to a first GNSS band. The method also may comprise receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band. The method also may comprise determining a first position estimate based at least in part on the first at least one GNSS signal. The method also may comprise obtaining data indicating spoofing may be occurring in the first GNSS band. The method also may comprise responsive to obtaining the data, operating the GNSS receiver in a second state with respect to the first GNSS band. The method also may comprise receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band. The method also may comprise determining a second position estimate based at least in part on the second set of GNSS signals, wherein: determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

An example device for operating a Global Navigation Satellite System (GNSS) receiver, according to this disclosure, may comprise the GNSS receiver, a memory, one or more processors communicatively coupled with the GNSS receiver and the memory, wherein the one or more processors are configured to operate the GNSS receiver in a first state with respect to a first GNSS band. The one or more processing units further may be configured to receive a first set of GNSS signals via the GNSS receiver, the first set of GNSS signals comprising a first at least one GNSS signal, the first at least one GNSS signal received via the first GNSS band while the GNSS receiver is operating in the first state with respect to the first GNSS band. The one or more processing units further may be configured to determine a first position estimate based at least in part on the first at least one GNSS signal. The one or more processing units further may be configured to obtain data indicating spoofing may be occurring in the first GNSS band. The one or more processing units further may be configured to, responsive to obtaining the data, operate the GNSS receiver in a second state with respect to the first GNSS band. The one or more processing units further may be configured to receive a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band. The one or more processing units further may be configured to determine a second position estimate based at least in part on the second set of GNSS signals, wherein: determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

An example apparatus for operating a Global Navigation Satellite System (GNSS) receiver, according to this disclosure, may comprise means for operating the GNSS receiver in a first state with respect to a first GNSS band. The apparatus further may comprise means for receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band. The apparatus further may comprise means for determining a first position estimate based at least in part on the first at least one GNSS signal. The apparatus further may comprise means for obtaining data indicating spoofing may be occurring in the first GNSS band. The apparatus further may comprise means for operating the GNSS receiver in a second state with respect to the first GNSS band responsive to obtaining the data. The apparatus further may comprise means for receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band. The apparatus further may comprise means for determining a second position estimate based at least in part on the second set of GNSS signals, wherein: determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

According to this disclosure, an example non-transitory computer-readable medium stores instructions for operating a Global Navigation Satellite System (GNSS) receiver, the instructions comprising code for operating the GNSS receiver in a first state with respect to a first GNSS band. The instructions further may comprise code for receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band. The instructions further may comprise code for determining a first position estimate based at least in part on the first at least one GNSS signal. The instructions further may comprise code for obtaining data indicating spoofing may be occurring in the first GNSS band. The instructions further may comprise code for responsive to obtaining the data, operating the GNSS receiver in a second state with respect to the first GNSS band. The instructions further may comprise code for receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band. The instructions further may comprise code for determining a second position estimate based at least in part on the second set of GNSS signals, wherein: determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

These illustrative examples are mentioned not to limit or define the scope of this disclosure, but rather to provide examples to aid understanding thereof. Illustrative examples are discussed in the Detailed Description, which provides further description. Advantages offered by various examples may be further understood by examining this specification.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

Figure 1:
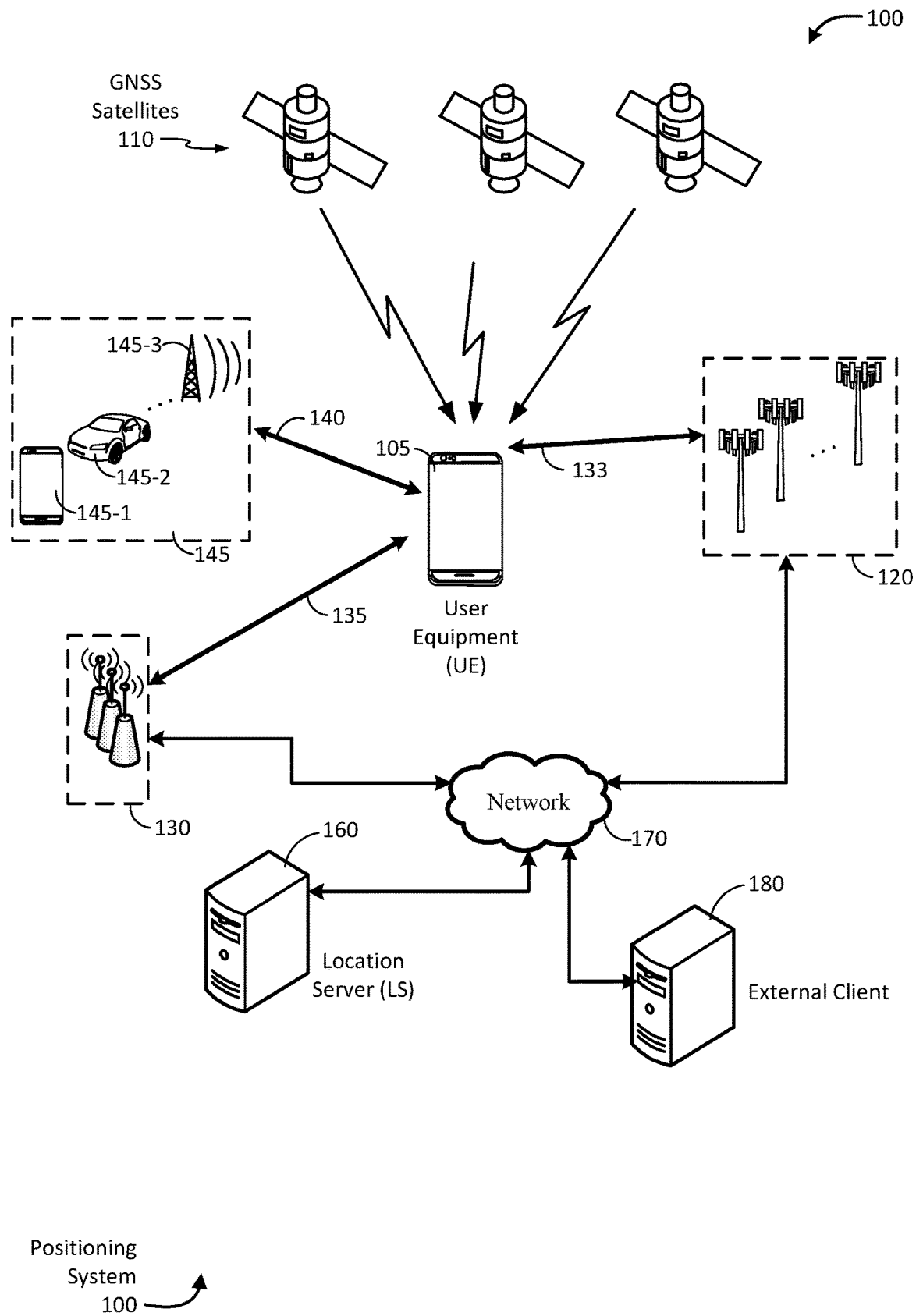
FIG. 1 is a graph illustrating an example positioning system in which, according to some embodiments, the techniques described herein for operating a global navigation satellite system (GNSS) receiver during likely spoofing may be performed.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3 etc. or as 110a, 110b, 110c, etc. When referring to such an element using only the first number, any instance of the element is to be understood (e.g., element 110 in the previous example would refer to elements 110-1, 110-2, and 110-3 or to elements 110a, 110b, and 110c).

DETAILED DESCRIPTION

Several illustrative examples will now be described with respect to the accompanying drawings, which form a part hereof. While particular examples, in which one or more aspects of the disclosure may be implemented, are described below, other examples may be used and various modifications may be made without departing from the scope of the disclosure or the spirit of the appended claims.

Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples.

The methodologies described herein may be implemented by various means depending upon applications according to particular examples. For example, such methodologies may be implemented in hardware, firmware, software, and/or combinations thereof. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

As used herein, the terms "mobile device" and "User Equipment" (UE) may be used interchangeably and are not intended to be specific or otherwise limited to any particular Radio Access Technology (RAT), unless otherwise noted. In general, a mobile device and/or UE may be any wireless communication device (e.g., a mobile phone, router, tablet computer, laptop computer, tracking device, wearable (e.g., smartwatch, glasses, Augmented Reality (AR)/Virtual Reality (VR) headset, etc.), vehicle (e.g., automobile, vessel, aircraft motorcycle, bicycle, etc.), Internet of Things (IoT) device, etc.), or other electronic device that may be used for Global Navigation Satellite Systems (GNSS) positioning as described herein. According to some embodiments, a mobile device or UE may be used to communicate over a wireless communications network. A UE may be mobile or may (e.g., at certain times) be stationary, and may communicate with a Radio Access Network (RAN). As used herein, the term UE may be referred to interchangeably as an Access Terminal (AT), a client device, a wireless device, a subscriber device, a subscriber terminal, a subscriber station, a user terminal (UT), a mobile device, a mobile terminal, a mobile station, or variations thereof. Generally, UEs can communicate with a core network via a RAN, and through the core network, the UEs can be connected with external networks (such as the Internet) and with other UEs. Other mechanisms of connecting to the core network and/or the Internet are also possible for the UEs, such as over wired access networks, wireless local area network (WLAN) networks (e.g., based on IEEE 802.11, etc.), and so on.

"Instructions" as referred to herein relate to expressions which represent one or more logical operations. For example, instructions may be "machine-readable" by being interpretable by a machine for executing one or more operations on one or more data objects. However, this is merely an example of instructions and claimed subject matter is not limited in this respect. In another example, instructions as referred to herein may relate to encoded commands which are executable by a processing circuit having a command set which includes the encoded commands. Such an instruction may be encoded in the form of a machine language understood by the processing circuit. Again, these are merely examples of an instruction and claimed subject matter is not limited in this respect.

"Storage medium" as referred to herein relates to media capable of maintaining expressions which are perceivable by one or more machines. For example, a storage medium may comprise one or more storage devices for storing machine-readable instructions and/or information. Such storage devices may comprise any one of several media types including, for example, magnetic, optical or semiconductor storage media. Such storage devices may also comprise any type of long term, short term, volatile or non-volatile devices memory devices. However, these are merely examples of a storage medium and claimed subject matter is not limited in these respects.

Unless specifically stated otherwise, as apparent from the following discussion, it is appreciated that throughout this specification discussions utilizing terms such as "processing," "computing," "calculating," "selecting," "forming," "enabling," "inhibiting," "locating," "terminating," "identifying," "initiating," "detecting," "obtaining," "hosting," "maintaining," "representing," "estimating," "receiving," "transmitting," "determining" and/or the like refer to the actions and/or processes that may be performed by a computing platform, such as a computer or a similar electronic computing device, that manipulates and/or transforms data represented as physical electronic and/or magnetic quantities and/or other physical quantities within the computing platform's processors, memories, registers, and/or other information storage, transmission, reception and/or display devices. Such actions and/or processes may be executed by a computing platform under the control of machine-readable instructions stored in a storage medium, for example. Such machine-readable instructions may comprise, for example, software or firmware stored in a storage medium included as part of a computing platform ("e.g., included as part of a processing circuit or external to such a processing circuit"). Further, unless specifically stated otherwise, processes described herein, with reference to flow diagrams or otherwise, may also be executed and/or controlled, in whole or in part, by such a computing platform.

A "space vehicle" (SV) as referred to herein, relates to an object that is capable of transmitting signals to receivers on the earth's surface. In one particular example, such a SV may comprise a geostationary satellite. Alternatively, a SV may comprise a satellite traveling in an orbit and moving relative to a stationary position on the earth. However, these are merely examples of SVs and claimed subject matter is not limited in these respects. SVs also may be referred to herein simply as "satellites."

A "location," as referred to herein, relates to information indicative of the whereabouts of an object or thing according to a point of reference. Here, for example, such a location may be represented as geographic coordinates such as latitude and longitude. In another example, such a location may be represented as earth-centered XYZ coordinates. In yet another example, such a location may be represented as a street address, municipality or other governmental jurisdiction, postal zip code and/or the like. However, these are merely examples of how a location may be represented according to particular examples and claimed subject matter is not limited in these respects.

Location determination techniques described herein may be used for various wireless communication networks such as a wireless wide area network (WWAN), a WLAN, a wireless personal area network (WPAN), and so on. The terms "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more RATs such as cdma2000, Wideband-CDMA (W-CDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named 3rd Generation Partnership Project (3GPP). Cdma2000 is described in documents from a consortium named 3rd Generation Partnership Project 2 (3GPP2). 3GPP and 3GPP2 documents are publicly available. A WLAN may comprise an IEEE 802.11x network, and a WPAN may comprise a Bluetooth network, an IEEE 802.15x, for example. Such location determination techniques described herein may also be used for any combination of WWAN, WLAN and/or WPAN.

According to an example, a device and/or system may estimate its location based, at least in part, on signals received from SVs. In particular, such a device and/or system may obtain pseudorange measurements comprising approximations of distances between associated SVs and a navigation satellite receiver. In a particular example, such a pseudorange may be determined at a receiver that is capable of processing signals from one or more SVs as part of a GNSS (which may also be referred to as a Satellite Positioning System (SPS)). Examples of GNSS systems include Global Positioning System (GPS), established by the United States; Globalnaya Navigatsionnay Sputnikovaya Sistema, or Global Orbiting Navigation Satellite System (GLONASS), established by the Russian Federation and similar in concept to GPS; the BeiDou Navigation Satellite System (BDS) created by the Chinese; and Galileo, also similar to GPS but created by the European Community and slated for full operational capacity in the near future. To determine its position, a satellite navigation receiver may obtain pseudorange measurements to four or more satellites as well as their positions at time of transmitting. Knowing the SVs' orbital parameters, these positions can be calculated for any point in time. A pseudorange measurement may then be determined based, at least in part, on the time a signal travels from a SV to the receiver, multiplied by the speed of light. While techniques described herein may be provided as implementations of location determination in a GPS and/or Galileo types of SPS as specific illustrations according to particular examples, it should be understood that these techniques may also apply to other types of GNSS systems, and that claimed subject matter is not limited in this respect.

A GNSS as referred to herein relates to a navigation system comprising SVs transmitting synchronized navigation signals according to a common signaling format. Such a GNSS may comprise, for example, a constellation of SVs in synchronized orbits to transmit navigation signals to locations on a vast portion of the Earth's surface simultaneously from multiple SVs in the constellation. A SV which is a member of a particular GNSS constellation typically transmits navigation signals in a format that is unique to the particular GNSS format. Accordingly, techniques for acquiring a navigation signal transmitted by a SV in a first GNSS may be altered for acquiring a navigation signal transmitted by a SV in a second GNSS. In a particular example, although claimed subject matter is not limited in this respect, it should be understood that GPS, Galileo and GLONASS each represent a GNSS which is distinct from the other two named SPS. However, these are merely examples of SPS' associated with distinct GNSS' and claimed subject matter is not limited in this respect.

According to an embodiment, a navigation receiver may obtain a pseudorange measurement to a particular SV based, at least in part, on an acquisition of a signal from the particular SV which is encoded with a periodically repeating pseudo-noise (PN) (or pseudo-random-noise (PRN)) code sequence. Acquisition of such a signal may comprise detecting a "code phase" which is referenced to time and associated with a point in the PN code sequence. In one particular embodiment, for example, such a code phase may be referenced to a state of a locally generated clock signal and a particular chip in the PN code sequence. However, this is merely an example of how a code phase may be represented and claimed subject matter is not limited in this respect.

According to an embodiment, detection of a code phase may provide several ambiguous candidate pseudoranges or pseudorange hypotheses at PN code intervals. Accordingly, a navigation receiver may obtain a pseudorange measurement to the SV based, at least in part, upon the detected code phase and a resolution of ambiguities to select one of the pseudorange hypotheses as the pseudorange measurement to the SV. As pointed out above, a navigation receiver may estimate its location based, at least in part, on pseudorange measurements obtained from multiple SVs.

As illustrated below according to a particular embodiment, a navigation receiver may acquire a first signal from a first SV to detect a code phase of the first signal. In acquiring a second signal from a second SV, a navigation receiver may search for a code phase over a limited code phase search range in the second signal based, at least in part, on the code phase of the acquired first signal. Accordingly, the code phase of the acquired first signal allows such a navigation receiver to acquire the second signal faster and/or using fewer processing resources.

Signals transmitted by GNSS SVs generally have very low signal strength (e.g., less than −120 dBm) by the time they arrive at a GNSS receiver. As a result, radio interference can overpower weak GNSS signals, causing satellite signal loss and potentially loss of positioning. However, malicious actors may take advantage of this effect to "spoof" GNSS signals, which may be used to send incorrect information in a competing signal that a GNSS navigation system then uses to determine navigational data or time data that is different than what would otherwise be determined based on true GNSS signals. Thus, spoofing is an intelligent form of interference which makes the receiver report false time and/or navigational information. This can cause vehicles and/or other devices that rely on GNSS navigation signals to stray off course, or in extreme cases, GNSS spoofing systems can take control of a navigation system and reroute a vehicle to an unintended location. Thus, spoofing systems can result in accidents or other mischief. GNSS-based devices and/or systems may therefore implement spoofing detection and/or spoofing mitigation to reduce the effects of such spoofing.

Embodiments herein address these and other issues by providing for modified GNSS receiver operation once the GNSS receiver obtains information indicative of likely spoofing. More specifically, once a GNSS receiver obtains information indicative of likely spoofing (e.g., determining that a likelihood of spoofing exceeds a threshold or receiving an indication that spoofing is occurring), the GNSS receiver may be operated in a reduced operational state with respect to one or more GNSS bands that are likely being spoofed. By operating the GNSS receiver in a reduced operational state with respect to the one or more GNSS bands that are likely being spoofed in the manner provided in the embodiments described hereafter, embodiments may help mitigate adverse effects of such spoofing on positioning and/or timing applications supported by the GNSS receiver, provide for power savings, and enable the determination of when the likely spoofing has stopped. Additional details are provided after a description of positioning and GNSS systems.

FIG. 1 is a simplified illustration of a positioning system 100 in which a UE 105, location server (LS) 160, and/or other components of the positioning system 100 in which the techniques herein for operating a GNSS receiver during spoofing (or likely spoofing) may be performed, according to an embodiment. The techniques described herein may be implemented by one or more components of the positioning system 100. The positioning system 100 can include a UE 105, one or more GNSS satellites 110 (or SVs) for a GNSS such as GPS, base stations 120, access points (APs) 130, location server (LS) 160, network 170, and an external client 180. Generally put, the positioning system 100 can estimate a location of the UE 105 based on radio frequency (RF) signals received by and/or sent from the UE 105 and known locations of other components (e.g., GNSS satellites 110, base stations 120, APs 130) transmitting and/or receiving the RF signals.

In this example, FIG. 1 illustrates the UE 105 as a smartphone device, however, UEs may be any suitable device that includes GNSS capabilities or may be a device or machine into which such GNSS capabilities are integrated. Thus, a UE 105 may include personal devices such as a smartphone, smartwatch, tablet, laptop, etc. However, UEs may include a larger class of device as well and may include vehicles with integrated GNSS receivers and positioning systems, such as boats or ships, cars, trucks, aircraft, shipping containers, etc.

It should be noted that FIG. 1 provides only a generalized illustration of various components, any or all of which may be utilized as appropriate, and each of which may be duplicated as necessary. Specifically, although only one UE 105 is illustrated, it will be understood that many UEs (e.g., hundreds, thousands, millions, etc.) may utilize the positioning system 100. Similarly, the positioning system 100 may include a larger or smaller number of base stations 120 and/or APs 130 than illustrated in FIG. 1. The illustrated connections that connect the various components in the positioning system 100 comprise data and signaling connections which may include additional (intermediary) components, direct or indirect physical and/or wireless connections, and/or additional networks. Furthermore, components may be rearranged, combined, separated, substituted, and/or omitted, depending on desired functionality. In some embodiments, for example, the external client 180 may be directly connected to LS 160. A person of ordinary skill in the art will recognize many modifications to the components illustrated.

Depending on desired functionality, the network 170 may comprise any of a variety of wireless and/or wireline networks. The network 170 can, for example, comprise any combination of public and/or private networks, local and/or wide-area networks, and the like. Furthermore, the network 170 may utilize one or more wired and/or wireless communication technologies. In some embodiments, the network 170 may comprise a cellular or other mobile network, a WLAN, a WWAN, and/or the Internet, for example. Particular examples of network 170 include a Long Term Evolution (LTE) wireless network, a Fifth Generation (5G) wireless network (also referred to as New Radio (NR) wireless network), a Wi-Fi wireless local area network (WLAN) and the Internet. LTE, 5G and NR are wireless technologies defined, or being defined, by the 3rd Generation Partnership Project (3GPP). Network 170 may also include more than one network and/or more than one type of network.

The base stations (BS) 120 and access points (APs) 130 are communicatively coupled to the network 170. In some embodiments, the base station 120 may be owned, maintained, and/or operated by a cellular network provider, and may employ any of a variety of wireless technologies, as described herein below. Depending on the technology of the network 170, a base station 120 may comprise a node B, an Evolved Node B (eNodeB or eNB), a base transceiver station (BTS), a radio base station (RBS), an NR NodeB (gNB), a Next Generation eNB (ng-eNB), or the like. A base station 120 that is a gNB or ng-eNB may be part of a Next Generation Radio Access Network (NG-RAN) which may connect to a 5G Core Network (5GC) in the case that Network 170 is a 5G network. An AP 130 may comprise a Wi-Fi AP or a Bluetooth® AP, for example. Thus, UE 105 can send and receive information with network-connected devices, such as LS 160, by accessing the network 170 via a base station 120 using a first communication link 133. Additionally or alternatively, because APs 130 also may be communicatively coupled with the network 170, UE 105 may communicate with Internet-connected devices, including LS 160, using a second communication link 135.

The LS 160 may comprise a server and/or other computing device configured to determine an estimated location of UE 105 and/or provide data (e.g., "assistance data") to UE 105 to facilitate the location determination. According to some embodiments, LS 160 may comprise a Home Secure User Plane Location (SUPL) Location Platform (H-SLP), which may support the SUPL user plane (UP) location solution defined by the Open Mobile Alliance (OMA) and may support location services for UE 105 based on subscription information for UE 105 stored in LS 160. In some embodiments, the LS 160 may comprise, a Discovered SLP (D-SLP) or an Emergency SLP (E-SLP). The LS 160 may also comprise an Enhanced Serving Mobile Location Center (E-SMLC) that supports location of UE 105 using a control plane (CP) location solution for LTE radio access by UE 105. The LS 160 may further comprise a Location Management Function (LMF) that supports location of UE 105 using a control plane (CP) location solution for 5G or NR radio access by UE 105. In a CP location solution, signaling to control and manage the location of UE 105 may be exchanged between elements of network 170 and with UE 105 using existing network interfaces and protocols and as signaling from the perspective of network 170. In a UP location solution, signaling to control and manage the location of UE 105 may be exchanged between LS 160 and UE 105 as data (e.g., data transported using the Internet Protocol (IP) and/or Transmission Control Protocol (TCP)) from the perspective of network 170.

As previously noted, the estimated location of UE 105 may be based on measurements of RF signals sent from and/or received by the UE 105. In particular, these measurements can provide information regarding the relative distance and/or angle of the UE 105 from one or more components in the positioning system 100 (e.g., GNSS satellites 110, APs 130, base stations 120). The estimated location of the UE 105 can be estimated geometrically (e.g., using multiangulation and/or multilateration), based on the distance and/or angle measurements, along with known position of the one or more components.

Although terrestrial components such as APs 130 and base stations 120 may be fixed, embodiments are not so limited. Mobile components may be used. For example, in some embodiments, a location of the UE 105 may be estimated at least in part based on measurements of RF signals 140 communicated between the UE 105 and one or more other UEs 145, which may be mobile or fixed. As illustrated, other UEs may include, for example, a mobile phone 145-1, vehicle 145-2, and/or static communication/positioning device 145-3. When or more other UEs 145 are used in the position determination of a particular UE 105, the UE 105 for which the position is to be determined may be referred to as the "target UE," and each of the one or more other UEs 145 used may be referred to as an "anchor UE." For position determination of a target UE, the respective positions of the one or more anchor UEs may be known and/or jointly determined with the target UE. Direct communication between the one or more other UEs 145 and UE 105 may comprise sidelink and/or similar Device-to-Device (D2D) communication technologies. Sidelink, which is defined by 3GPP, is a form of D2D communication under the cellular-based LTE and NR standards.

According to some embodiments, such as when the UE 105 comprises and/or is incorporated into a vehicle, a form of D2D communication used by the UE 105 may comprise vehicle-to-everything (V2X) communication. V2X is a communication standard for vehicles and related entities to exchange information regarding a traffic environment. V2X can include vehicle-to-vehicle (V2V) communication between V2X-capable vehicles, vehicle-to-infrastructure (V2I) communication between the vehicle and infrastructure-based devices (commonly termed roadside units (RSUs)), vehicle-to-person (V2P) communication between vehicles and nearby people (pedestrians, cyclists, and other road users), and the like. Further, V2X can use any of a variety of wireless RF communication technologies. Cellular V2X (CV2X), for example, is a form of V2X that uses cellular-based communication such as LTE (4G), NR (5G) and/or other cellular technologies in a direct-communication mode as defined by 3GPP. The UE 105 illustrated in FIG. 1 may correspond with a component or device on a vehicle, RSU, or other V2X entity that is used to communicate V2X messages. The static communication/positioning device 145-3 (which may correspond with an RSU) and/or the vehicle 145-2, therefore, may communicate with the UE 105 and may be used to determine the position of the UE 105 using techniques similar to those used by base stations 120 and/or APs 130 (e.g., using multiangulation and/or multilateration). It can be further noted that UEs 145 (which may include V2X devices), base stations 120, and/or APs 130 may be used together (e.g., in a WWAN positioning solution) to determine the position of the UE 105, according to some embodiments.

An estimated location of UE 105 can be used in a variety of applications—e.g., to assist direction finding or navigation for a user of UE 105 or to assist another user (e.g., associated with external client 180) to locate UE 105. A "location" is also referred to herein as a "location estimate", "estimated location", "location", "position", "position estimate", "position fix", "estimated position", "location fix" or "fix". A location of UE 105 may comprise an absolute location of UE 105 (e.g., a latitude and longitude and possibly altitude) or a relative location of UE 105 (e.g., a location expressed as distances north or south, east or west and possibly above or below some other known fixed location or some other location such as a location for UE 105 at some known previous time). A location may also be specified as a geodetic location (as a latitude and longitude) or as a civic location (e.g., in terms of a street address or using other location related names and labels). A location may further include an uncertainty or error indication, such as a horizontal and possibly vertical distance by which the location is expected to be in error or an indication of an area or volume (e.g., a circle or ellipse) within which UE 105 is expected to be located with some level of confidence (e.g., 95% confidence).

The external client 180 may be a web server or remote application that may have some association with UE 105 (e.g., may be accessed by a user of UE 105) or may be a server, application, or computer system providing a location service to some other user or users which may include obtaining and providing the location of UE 105 (e.g., to enable a service such as friend or relative finder, asset tracking or child or pet location). Additionally or alternatively, the external client 180 may obtain and provide the location of UE 105 to an emergency services provider, government agency, etc.

Figure 2:
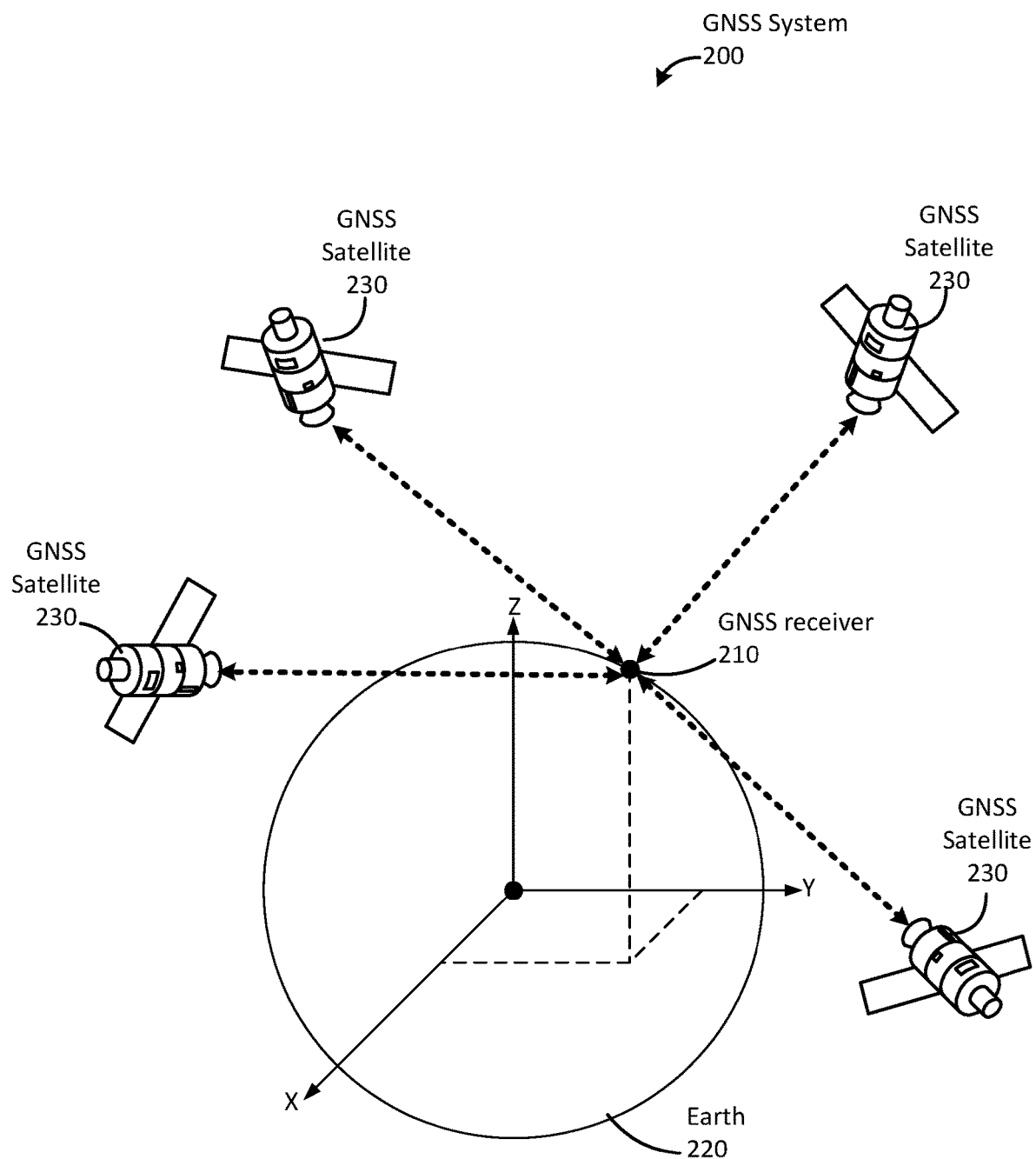
FIG. 2 is a simplified diagram of a GNSS system, according to an embodiment.

As illustrated in FIG. 1, the position of UE 105 may be determined in a variety of ways. Moreover, a positioning engine (e.g., Kalman filter) executed by the user equipment 105 may use position estimates from one or more of a variety of sources (GNSS, RAT-based positioning, etc.) to determine a final estimated location for the UE 105. FIG. 2 and the corresponding description below provide some additional detail regarding how the position of a GNSS receiver of the UE 105 may be determined.

FIG. 2 is a simplified diagram of a GNSS system 200, provided to illustrate how GNSS is generally used to determine an accurate location of a GNSS receiver 210 on earth 220. As previously noted, a GNSS receiver 210 may be incorporated into a UE 105 or similar mobile device, and GNSS positioning may be one of a plurality of positioning techniques that may be employed to determine the location of the UE/mobile device. Put generally, the GNSS system 200 enables an accurate GNSS position fix of the GNSS receiver 210, which receives radio RF signals from GNSS satellites 230 from one or more GNSS constellations. (GNSS satellites 230 of FIG. 2 may correspond with GNSS satellites 110 of FIG. 1.)

It will be understood that the diagram provided in FIG. 2 is greatly simplified. In practice, there may be dozens of satellites 230 and a given GNSS constellation, and there are many different types of GNSS systems. GNSS systems include, for example, GPS, Galileo, GLONASS, and BDS, as noted. Additionally, GNSS systems may include Quasi-Zenith Satellite System (QZSS) over Japan, Indian Regional Navigational Satellite System (IRNSS) over India, and/or the like. In addition to the basic positioning functionality later described, GNSS augmentation (e.g., a Satellite Based Augmentation System (SBAS)) may be used to provide higher accuracy. Such augmentation may be associated with or otherwise enabled for use with one or more global and/or regional navigation satellite systems, such as, e.g., Wide Area Augmentation System (WAAS), European Geostationary Navigation Overlay Service (EGNOS), Multi-functional Satellite Augmentation System (MSAS), and Geo Augmented Navigation system (GAGAN), and/or the like.

GNSS positioning is based on trilateration, which is a method of determining position by measuring distances to points at known coordinates. In general, the determination of the position of a GNSS receiver 210 in three dimensions may rely on a determination of the distance between the GNSS receiver 210 and four or more satellites 230. As illustrated, 3D coordinates may be based on a coordinate system (e.g., XYZ coordinates; latitude, longitude, and altitude; etc.) centered at the earth's center of mass. A distance between each satellite 230 and the GNSS receiver 210 may be determined using precise measurements made by the GNSS receiver 210 of a difference in time from when a radio frequency RF signal is transmitted from the respective satellite 230 and when it is received at the GNSS receiver 210. To help ensure accuracy, not only does the GNSS receiver 210 need to make an accurate determination of when the respective signal from each satellite 230 is received, but many additional factors need to be considered and accounted for. These factors include, for example, clock differences at the GNSS receiver 210 and satellite 230 (e.g., clock bias), a precise location of each satellite 230 at the time of transmission (e.g., as determined by the broadcast ephemeris), the impact of atmospheric distortion (e.g., ionospheric and tropospheric delays), and the like.

To perform a traditional GNSS position fix, the GNSS receiver 210 can use code-based positioning to determine its distance to each satellite 230 based on a determined delay in a generated pseudorandom binary sequence received in the RF signals received from each satellite, in consideration of the additional factors and error sources previously noted. With the distance and location information of the satellites 230, the GNSS receiver 210 can then determine a position fix for its location. This position fix may be determined, for example, by a Standalone Positioning Engine (SPE) executed by one or more processors of the GNSS receiver 210. However, code-based positioning is relatively inaccurate and, without error correction, is subject to many of the previously described errors. Even so, code-based GNSS positioning can provide a positioning accuracy for the GNSS receiver 210 on the order of meters.

More accurate carrier-based ranging is based on a carrier wave of the RF signals from satellites and may use measurements at a base or reference station (not shown) to perform error correction to help reduce errors from the previously noted error sources. More specifically, errors (e.g., atmospheric errors sources) in the carrier-based ranging of satellites 230 observed by the GNSS receiver 210 can be mitigated or canceled based on similar carrier-based ranging of the satellites 230 using a highly accurate GNSS receiver at the base station at a known location. These measurements and the base station's location can be provided to the GNSS receiver 210 for error correction. This position fix may be determined, for example, by a Precise Positioning Engine (PPE) executed by one or more processors of the GNSS receiver 210. More specifically, in addition to the information provided to an SPE, the PPE may use base station GNSS measurement information, and additional correction information, such as precise orbit and clock, troposphere and ionosphere, to provide a high accuracy, carrier-based position fix. Several GNSS techniques can be adopted in PPE, such as Differential GNSS (DGNSS), Real Time Kinematic (RTK), and Precise Point Positioning (PPP), and may provide a sub-meter accuracy (e.g., on the order of centimeters).

Figure 3:
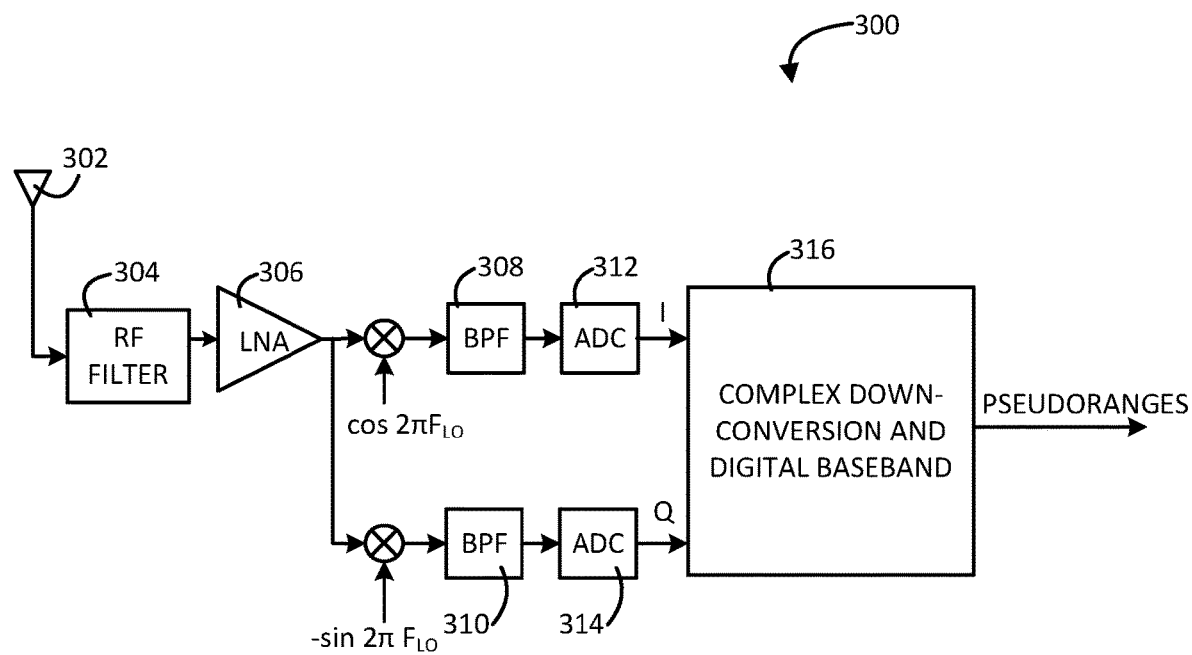
FIG. 3 is a simplified block diagram of an example signal processing architecture that may be used in a GNSS receiver, according to an embodiment.

FIG. 3 illustrates a simplified block diagram of an example signal processing architecture 300 that may be used in a GNSS receiver (e.g., GNSS receiver 210 of FIG. 2, which again may be incorporated into a UE 105 of FIG. 1) to implement GNSS signal acquisition and tracking, and determine pseudo-ranges (range measurements) for GNSS-based positioning. This signal processing architecture 300 may be implemented in hardware and/or software components of a GNSS receiver, such as the GNSS receiver 880 of FIG. 8, which is described in more detail hereafter. The signal processing architecture 300 processes two GNSS signals, $GNSS_1$ and $GNSS_2$, by mixing the received signals with a local oscillator (LO) signal having a frequency $F_{LO}$ that is determined based, at least in part, on first and second carrier frequencies $f_1$ and $f_2$. As shown in FIG. 3, according to a particular implementation, signal processing architecture 300 may receive signals $GNSS_1$ and $GNSS_2$ at a single radio frequency RF antenna 302, a bandpass RF filter 304 such as surface acoustic wave (SAW) filter and low-noise amplifier 306. The received GNSS signals may then be complexly down-converted to intermediate frequencies by mixing the received signals with the LO signal as shown.

In this context, a "down-conversion" may relate to transforming an input signal having a first frequency characteristic to an output signal having second frequency characteristic. In one particular implementation, although claimed subject matter is not limited in this respect, such a down-conversion may comprise transformation of a first signal to a second signal, where the second signal has a frequency characteristic of a lower frequency than that of the first signal. Here, in particular examples, such a down-conversion may comprise transformation of an RF signal to an intermediate frequency (IF) signal, or transformation of an IF signal to a baseband signal and/or baseband information. However, these are merely examples of a down-conversion and claimed subject matter is not limited in this respect.

In a particular implementation, by selecting $F_{LO}$ at about a midpoint between $f_1$ and $f_2$, portions of signals down-converted from signals received from components 302 and 304 may substantially covered by bandpass filters 308 and 310. Here, for example, a selection of a particular frequency for $F_{LO}$ may result in an image frequency component of one down-converted GNSS signal that may substantially overlapping a desired signal component of another down-converted GNSS signal. In particular embodiments, impacts of such overlapping can be avoided without attenuating image frequency components before mixing with LO. It should be understood, however, that in other implementations $F_{LO}$ may be selected to be somewhere other than about a midpoint between $f_1$ and $f_2$, and claimed subject matter is not limited in this respect.

In-phase (I) and quadrature (Q) components filtered by associated band-pass filters (BPFs) 308 and 310 may then be digitally sampled at analog to digital conversion circuits (ADCs) 312 and 314 to provide digitally sampled in-phase and quadrature components for further processing (e.g., acquisition and/or tracking as described herein). Here, ADCs 312 and 314 may be adapted to sample output signals of BPFs 308 and 310 at or above the Nyquist rate of the combined signal. Also, the presently illustrated implementation includes ADCs 312 and 314 between first and second down-conversion stages. It should be understood, however, that other architectures may be implemented without deviating from claimed subject matter. In other implementations, for example, analog to digital conversion may occur following a second down-conversion. Again, these are merely example implementations and claimed subject matter is not limited in these respects.

Also, in alternative implementations, ADCs 312 and 314 may be replaced with a single complex ADC or with a single time shared and/or multiplexed ADC with appropriate delays to be shared between in-phase and quadrature signal paths.

In particular implementations, $GNSS_1$ and/or $GNSS_2$ may comprise any one of several pairs of different GNSS signals. In one particular embodiment, although claimed subject matter is not limited in this respect, $GNSS_1$ and $GNSS_2$ may be selected such that $f_1$ and $f_2$ are near in frequency to enable low cost manufacture of RF filter 304 (e.g., a SAW filter) and/or low-noise amplifier (LNA) 306 by limiting an operating band. While $GNSS_1$ and $GNSS_2$ may be selected such that $f_1$ and $f_2$ are near in frequency (e.g., both being in an L1 band or both being in an L2 band) as illustrated above in particular embodiments, claimed subject matter is not limited in this respect. In alternative embodiments, GNSS signals transmitted at more greatly separated carrier frequencies may be down-converted to a common intermediate frequency in a single receiver channel as illustrated above. In one particular example, an SV in a GNSS constellation may transmit multiple GNSS signals at different carrier frequencies and/or frequency bands such as, for example, L1 and L2 frequency bands.

In particular embodiments, the bandwidth of BPFs 308 and 310 may be centered at about a common intermediate frequency $IF_o$ to process portions of GNSS signals received from both $GNSS_1$ and $GNSS_2$. In addition, the bandwidth of BPFs 308 and 310 may be implemented to be wide enough to capture enough information GNSS signals received from both $GNSS_1$ and $GNSS_2$ without introducing significant noise outside the bands of spectra 302 and 304. Additionally, BPFs 308 and 310 may be chosen to be narrow enough to enable sampling by ADCs 312 and 314 at a given sample rate (e.g., at about the Nyquist rate) without significant distortion.

According to particular implementations, sampled in-phase and quadrature components provided by ADCs 312 and 314 may be further processed according to a complex down-conversion and digital baseband 316, can be used to generate in-phase and quadrature components, and output pseudoranges derived from the GNSS signals. According to some embodiments, the output of the complex down-conversion and digital baseband 316 may more broadly be referred to as a measurement, where the measurement may comprise a pseudorange, or a pseudorange and carrier phase.

Components from the RF antenna 302 to digital conversion at ADCs 312 and 314 may be referred to herein as an "RF front-end" and/or "analog front-end." As noted, the signal processing architecture 300 may be capable of processing multiple frequencies with a single RF antenna 302 and/or a single set of analog front-end components. To process other frequencies, a GNSS receiver may have multiple signal processing architectures 300 to be able to process GNSS satellite signals in multiple frequency bands/or from multiple GNSS constellations. For example, a GNSS receiver (e.g., GNSS receiver 210) may include a first signal processing architecture to process bands L1 and L2, and a second signal processing architecture two process band L5. In some embodiments, a GNSS receiver may include different analog front-end components for different bands (some of which may be shared, as in the case of GPS L1 and L2) and may share a single digital processing chip and/or digital processing structure to perform the complex down-conversion and digital baseband processing shown by block 316. Some embodiments may have separate digital processing circuitry.

The pseudoranges output by the architecture illustrated in FIG. 3 are used to determine a location of the GNSS receiver (and/or device, vehicle, etc. into which the GNSS receiver integrated or with which the GNSS receiver is co-located). Because the pseudoranges are dependent on signals received from GNSS satellites, spoofing of signals (e.g., timing and/or navigation signals) on one or more GNSS bands may adversely impact a position estimate determined by the GNSS receiver. Such as spoofing is described in more detail with regard to FIG. 4.

Figure 4:
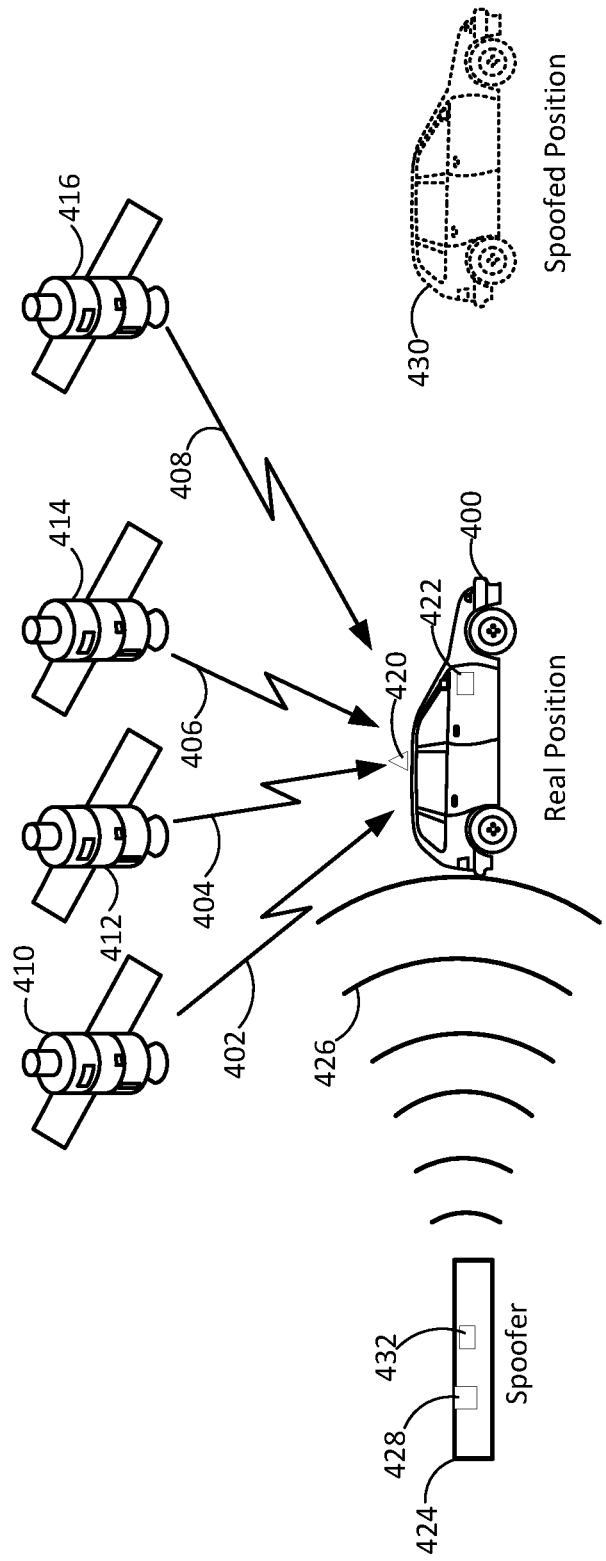
FIG. 4 is a diagram that depicts an example situation in which GNSS spoofing is occurring.

FIG. 4 is a diagram that depicts a situation where a vehicle 400 using GNSS navigation is receiving false GNSS satellite signals, i.e., it illustrates an example of spoofing. Again, a GNSS receiver may be integrated into other types of devices (mobile phones, navigation devices, GNSS tags, etc.), and embodiments herein are not limited to applications directed toward vehicles. In this example, vehicle 400 receives (e.g., using a GNSS receiver) real GNSS satellite signals 402, 404, 406, and 408 from a plurality of GNSS satellites 410, 412, 414, and 416, respectively. (GNSS satellites 410, 412, 414, and 416 may correspond with GNSS satellites 230 of FIG. 2 and/or GNSS satellites 110 of FIG. 1.) GNSS satellite signals 402, 404, 406, and 408 are received by antenna 420 which is attached to the vehicle 400. GNSS receiver 422, which is electrically connected to antenna 420 (which may correspond with RF antenna 302 of FIG. 3), receives signals 402, 404, 406, and 408, and computes the GNSS location coordinates of a location based on measurements of ranging information (e.g., pseudoranges) contained within signals 402, 404, 406, and 408. Vehicle 400 in various embodiments can include a navigation system and possibly a self-driving system that drives the vehicle 400 over a prescribed course using the computed GNSS coordinates of the location of the vehicle 400. It is to be understood that while antenna 420 is shown receiving GNSS satellite signals 402, 404, 406, and 408 from four GNSS satellites 410, 412, 414, and 416, antenna 420 can be receiving GNSS satellite signals from any number of GNSS satellites. Antenna 420 receives GNSS satellite signals from a plurality of GNSS satellites, where a plurality is any number greater than one. As noted with regard to FIG. 3, antenna 420 may comprise a plurality of antennas and/or analog front-end components.

FIG. 4 also depicts a spoofer 424. The spoofer 424 can include an antenna 428 and transmitter 432. The spoofer 424 can generate a wireless spoofing signal 426 that is received by the vehicle antenna 420. Spoofing signal 426 can be a composite signal which contains a plurality of false GNSS satellite signals. Spoofing signal 426 can be generated so as to mimic real GNSS satellite signals from one or more bands of one or more GNSS constellations. In various embodiments, the spoofer 424 is located at a fixed geographic location. In some embodiments, the spoofer 424 can be configured to be mobile (e.g., attached to another vehicle or vessel).

GNSS signal spoofer 424 can be designed to create false GNSS satellite signals in several ways. In some embodiments spoofer 424 creates spoofing signal 426 by simulating real GNSS satellite signals programmed with the desired false satellite data. In FIG. 4, the spoofer 424 captures real GNSS signals 402, 404, 406, 408 at an antenna 428, and then rebroadcasts these signals with a transmitter 432. In the embodiment shown in FIG. 4, spoofer 424 creates spoofing signal 426 by re-broadcasting live GNSS signals received at a location different from the GNSS navigational system that is to be spoofed. It is to be understood that spoofer 424 can create and broadcast spoofing signal 426 using any method that creates a spoofing signal 426 that includes data meant to be accepted as real GNSS signals. The spoofer 424 or multiple spoofers 424 may simulate stationary or moving locations as well. For example, some spoofers 424 can simulate a location that moves (e.g., in a circle) around a geographic area.

In the embodiment shown in FIG. 4, the spoofer 424 can includes an antenna 428 and a transmitter 432. Spoofer 424 generates spoofing signal 426 by re-broadcasting GNSS satellite signals 402, 404, 406, and 408 received at spoof antenna from live GNSS satellites 410, 412, 414, and 416. Satellites 410, 412, 414, and 416, can be the same or different GNSS satellites as satellites 410, 412, 414, and 416. Spoofing antenna 428 can be located at spoof location that is offset from the real vehicle 400 location. Real GNSS satellite signals 402, 404, 406, and 408 are combined into composite spoofing signal 426 and rebroadcast by a spoofing transmitter 432.

The spoofing signal 426 can be a composite of a plurality of GNSS satellite signals 402, 404, 406, and 408, as received by antenna 420. When GNSS satellite signals 402, 404, 406, and 408 are rebroadcast from the spoofer transmitter, they become false GNSS satellite signals because they contain data as received by the spoofer antenna 428 at a different location from the real position resulting in a spoofed position 430. Spoofing signal 426 can contain any number of false GNSS satellite signals.

The power level of spoofing signal 426 can be set such that when spoofing signal 426 is received by antenna 420, spoofing signal 426 overpowers real GNSS satellite signals 402, 404, 406, and 408. Consequently receiver 422 uses spoofing signal 426 to compute a GNSS location based. Specifically, receiver 422 will measure the GNSS satellite signal phase (code phase and/or carrier phase) φ values of false GNSS satellite signals 426, will use the code phase and/or the carrier phase φ values to compute GNSS location coordinates for a different location other than the true location, and will report that vehicle is at different location instead of its true location. This is the intent of spoofer 424 in some instances—to make receiver 422 determine, and report, that vehicle 400 is at false location, spoofed position 430 that is offset relative to real position. Spoofing of a navigational system can also be performed in order to make a navigational device provide false timing data. In addition, GNSS devices may be used in critical timing applications. Thus spoofing can cause false timing data to be provided by a GNSS receiver.

Because spoofing can result in these and other adverse effects, various techniques have been developed for determining spoofing. These techniques can include, for example, conducting consistency checks using data internal and/or external to the GNSS receiver, including checks among different positioning systems. A mobile device comprising a GNSS receiver also may have capabilities for position determination using other techniques. For example, as previously discussed, a UE (e.g., UE 105 of FIG. 1) may be capable of performing RAT-based positioning (e.g., using APs 130, base stations 120, and/or UEs 145, is previously described with respect to FIG. 1), dead reckoning (e.g., based on motion sensors), and/or other positioning techniques in conjunction with GNSS-based positioning. These positioning techniques only can be used to determine an accurate position of the UE, but also may be used to determine whether spoofing of a GNSS signal may be occurring (e.g., in instances in which a GNSS-based position estimation does not align with the position estimation of one or more other positioning techniques). Further, within the GNSS receiver itself, comparisons may be made between GNSS signals of different constellations and/or different GNSS frequency bands (also referred to herein simply as "GNSS bands") to identify GNSS signals/bands that may be spoofed. Thus, spoofing detection techniques may enable a GNSS receiver and/or mobile device into which the GNSS receiver is integrated to determine likely spoofing is or may be occurring on one or more GNSS bands and/or constellations. It can be noted that embodiments provided herein are described with regard to a GNSS band "likely being spoofed." This means that although a GNSS band may not necessarily be spoofed, a determination of whether spoofing is occurring has exceeded a threshold likelihood or level of confidence based on one or more techniques used to detect spoofing. According to some embodiments, a GNSS receiver may determine that spoofing is occurring based on a determination that the GNSS receiver is located in, or within a threshold distance from, a region in which GNSS spoofing has been previously determined to occur. Such regions can be established, for example, based on crowdsourcing information from various GNSS receivers. This information may be maintained by a server and distributed to various GNSS receivers (e.g., by a communication link, such as over the Internet).

Embodiments herein address how a GNSS receiver may be operated once the GNSS receiver obtains information indicative of likely spoofing. More specifically, once a GNSS receiver obtains information indicative of likely spoofing (e.g., determining that a likelihood of spoofing exceeds a threshold or receiving an indication that spoofing is occurring), in embodiments provide for operating the GNSS receiver in a reduced operational state with respect to one or more GNSS bands that are likely being spoofed. For simplicity, the spoofing of a "GNSS band" as described herein corresponds to the spoofing—or likely spoofing—of one or more signals received at a GNSS receiver via the GNSS band, where a spoofing signal mimics a signal (e.g., a GNSS timing and/or navigation signal) transmitted by a GNSS satellite. By operating the GNSS receiver in a reduced operational state with respect to the one or more GNSS bands that are likely being spoofed in the manner provided in the embodiments described hereafter, embodiments may help mitigate adverse effects of such spoofing on positioning and/or timing applications supported by the GNSS receiver, provide for power savings, and enable the determination of when the likely spoofing has stopped. According to embodiments, a reduced operational state with regard to a GNSS band comprise performing one or more of the following functions with respect to that GNSS band: disabling data demodulation and decoding, disabling time setting (e.g., time of week (TOW), week number, etc.) disabling acquisition of unknown/not visible satellites, disabling satellite differences, disabling error recovery, reducing non-coherent integration time, and duty cycling the power for one or more receiver blocks associated with the GNSS band. The following paragraphs provide more detail regarding each of these functions.

With regard to disabling data demodulation and decoding, the data conveyed on a signal transmitted by a GNSS satellite includes information about the satellite location, the time of transmission, as well as information about the other satellites in the constellation. Thus, if a signal in a GNSS band is spoofed, this transmitted data is likely unreliable and should not be used for calculating the receiver position and time. Further, data demodulation and decoding, which may occur in in a processor (e.g., block 316 of FIG. 3) consumes power. Thus, because data is unreliable and may not be used, embodiments may disable data demodulation and decoding, which can save power.

According to some embodiments, as noted hereafter, demodulation and decoding may be re-enabled at times (e.g., periodically, based on a triggering event, etc.) to perform data consistency checks and/or other operations that may be helpful in determining whether the likely spoofing of the GNSS band is ongoing. As such, data demodulation and decoding can be duty cycled (e.g., periodically enabled/disabled for predetermined lengths of time), enabling periodic "spot checks," if desired. Duty cycling in this manner may be performed by powering down one or more components used to perform the modulation and decoding, such as one or more components shown in the signal processing architecture 300 of FIG. 3. This can include, for example, any components of the RF front-end (or any subset of components thereof), digital processing circuitry (e.g., complex down-conversion and digital baseband at block 316), or a combination thereof.

Disabling a time setting regarding a GNSS band is another way in which a GNSS receiver may be operated at a reduced operational state with regard to the GNSS band. In various GNSS receivers, in scenarios in which a time uncertainty is greater than a threshold uncertainty, the GNSS receiver may decode time from the satellite data received via a GNSS band to compute receiver position in time. If the GNSS band is likely being spoofed, however, this functionality can be disabled to help ensure time is not decoded from a spoofed signal (in which case the time would likely be unreliable). That's functionality can make the GNSS receiver more robust against spoofing, since using a wrong time setting could prevent the receiver from acquiring satellite signals in un-spoofed GNSS bands. Thus, according to some embodiments, a GNSS receiver may be configured to disable a time setting regarding a GNSS band likely being spoofed.

For GNSS signals in some signal bands (e.g., GPS L1) there may be a significant risk of cross-correlation, where a strong signal from one GNSS satellite can be mis-detected as a weak signal from a different satellite. In normal (un-spoofed) operation, many GNSS receivers may search for GNSS satellites even if they are not expected to be visible or have unknown status. This operation can help ensure that all cross-correlation aggressors are tracked. It also may provide a recovery mechanism when a wrong position is provided from an external source. However, in cases in which a GNSS band is being spoofed, if these GNSS satellites (not expected to be visible or have unknown status) are detected, they are likely coming from the spoofer rather than any actual, newly-detected GNSS satellites. Thus, according to some embodiments, a GNSS receiver may be operated at a reduced operational state with regard to the GNSS band by disabling acquisition of unknown/not visible satellites after obtaining data indicative of likely spoofing with regard to one or more GNSS bands, which can help avoid acquiring additional signals likely coming from the spoofer. Among other things, this free up resources (memory and power) of the GNSS receiver, as well as save power. According to some embodiments, and similar to disabling data demodulation and decoding, the functionality of scanning for not visible/unknown GNSS satellites may be re-enabled (e.g., periodically) to help determine whether likely spoofing is ongoing.

Satellite differencing (or "SV differencing") is a technique where a two-dimensional search window (in codephase and Doppler dimensions) for one GNSS satellite can be reduced based on a coarse position and time estimates and the measured codephase and Doppler from another GNSS satellite. In a scenario in which a GNSS band may be spoofed, however, measurements from satellite signals within the GNSS band may be unreliable. As such, according to some embodiments, a GNSS receiver may be operated at a reduced operational state with regard to the GNSS band by disabling satellite differencing based on measurements of signals received via the GNSS band likely being spoofed.

According to some embodiments, various checks may be performed in the GNSS receiver to prevent it from getting stuck at a wrong time or position. Example checks include code carrier consistency and sub frame mis-alignment checks. If these checks result in a determination that the GNSS data (e.g., time and/or position data) is erroneous, it may trigger an error recovery procedure, which may which may result in measurement outages on all signal bands. In instances in which a GNSS band is being spoofed, these checks may not be reliable. For example, a spoofer may transmit satellite signals that have purposely mis-aligned subframes. Therefore, according to some embodiments, a GNSS receiver may be operated at a reduced operational state with regard to the GNSS band by disabling error recovery procedures if these checks fail with respect to a GNSS band if the GNSS band is likely being spoofed. This can improve the robustness of the positioning engine of the GNSS receiver during spoofing, enabling the GNSS receiver to determine position estimates based on signals from non-spoofed GNSS bands without running a risk that a failed check on the spoofed GNSS band may trigger an error recovery procedure that can disrupt the GNSS receiver's positioning estimation functionality. According to some embodiments, the checks themselves may still be run to help determine whether ongoing spoofing of the GNSS band is occurring.

Inter-Signal Time Bias (ISTB) is relative time bias between different GNSS bands and constellations. A GNSS receiver may use an ISTB estimate when combining satellite measurements from different GNSS bands and constellations. ISTB may include analog and digital processing delays in the receiver itself. Typically, a GNSS receiver may estimate and track ISTB for various GNSS bands using measurements of GNSS signals along with the computed positions. However, in a spoofed scenario, the ISTB between a spoofed signal in one GNSS band and a true signal on another GNSS band is likely to be different than the ISTB between the two true signals. With this in mind, according to some embodiments, a GNSS receiver may be operated at a reduced operational state with regard to the GNSS band by disabling ISTB estimation/updates using measurements obtained from a signal of the GNSS band likely being spoofed. That said, it may be useful to compute a separate spoofed ISTB value to determine whether ongoing spoofing of the GNSS band is occurring. Thus, some embodiments may do so.

With regard to reducing non-coherent integration time (or "dwell time"), GNSS satellite signals are received by the GNSS receiver at very weak signal levels (below the receiver noise floor). Thus, correlation techniques are used to improve Signal to Noise Ratio (SNR) and receiver sensitivity. In these correlation techniques, correlation is performed by multiplying the received signal by known Pseudo-Random Noise (PRN) sequences and integrating over an integration period that includes a coherent component and a non-coherent component. Coherent integration uses magnitude and phase information, while non-coherent integration uses energy only. Coherent integration improves SNR, while non-coherent integration improves Probability of False Alarm (Pfa) for a given detection threshold, thereby improving sensitivity. In many applications, coherent integration is typically much less than one second (e.g., 20 ms), while non-coherent integration it is often one second (matching 1 Hz positioning reporting) and may be longer. However, in cases where there is a strong spoofed signal, weak signals detected with a non-coherent integration time of greater than one second are likely to be cross-correlation. Thus, according to some embodiments, it may be better for a GNSS receiver not to look for weak signals, especially if acquiring unknown/not visible satellites is also disabled. Thus, according to some embodiments, a GNSS receiver may be operated at a reduced operational state with regard to the GNSS band by reducing a non-coherent integration time relative to typical operation (e.g., reducing non-coherent integration to less than one second for embodiments in which typical operation utilizes a non-coherent integration time of one second or greater). This reduction in non-coherent integration time cannot only reduce errors related to cross-correlation, but can also reduce the receiver resource requirements, potentially saving power.

According to some embodiments, this reduction in non-coherent integration time may be duty cycled (e.g., cycled through reduced and non-reduced non-coherent integration times) to help determine whether likely spoofing of the GNSS band is ongoing. According to some embodiments, duty cycling the non-coherent integration time may comprise powering down and/or powering off one or more components used to process signals received via the likely-spoofed GNSS band (e.g., one or more components illustrated in FIG. 3) for a period of time. For example, the non-coherent integration period may be reduced to less than one second by performing a duty cycle for each second in which one or more components of the GNSS receiver used to process the likely-spoofed GNSS band are powered down for a portion of the one second cycle. These components may comprise one or more receiver blocks, such as RF/analog front-end components, ADC, and the digital Baseband Processor (BP) channel. By reducing non-coherent integration by duty cycling components in this manner, a GNSS receiver may obtain continuous measurements at 1 Hz for the likely spoofed GNSS band, while reducing power significantly. Thus, according to some aspects, this functionality may be similar to duty-cycling features that can be enabled in some GNSS receivers to reduce power under benign signal conditions.

As noted in the description, a GNSS receiver may be operated at a reduced operational state with respect to a GNSS band likely being spoofed by powering on and off one or more components used to process signals received via the GNSS band in accordance with a duty cycle (e.g., components illustrated in FIG. 3). Additional details regarding such duty cycling are provided hereafter with regard to FIGS. 5 and 6.

Figure 5:
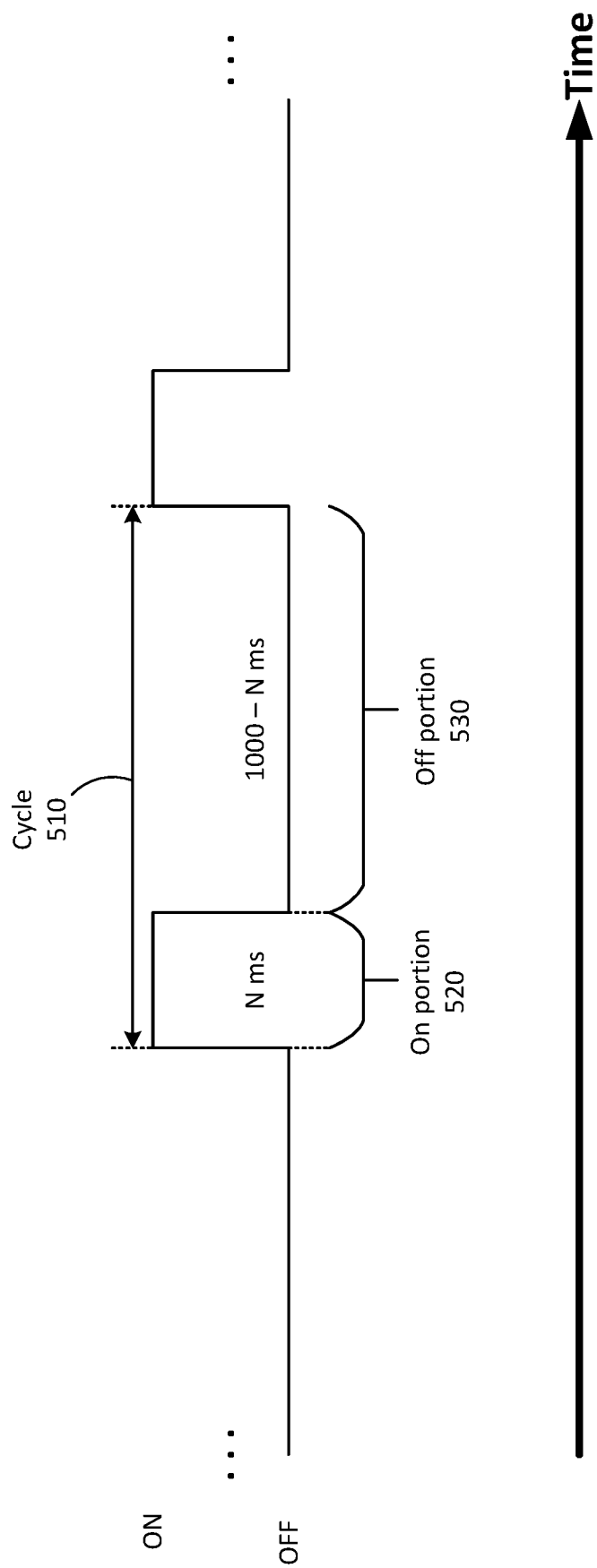
FIG. 5 is a diagram of an example of how power to one or more components of a GNSS receiver may be duty cycled, according to an embodiment.

FIG. 5 is a diagram of an example of how power to one or more components of a GNSS receiver may be duty cycled, according to an embodiment. In this example, a cycle 510 repeats periodically and comprises an on portion 520 and an off portion 530. In particular, where the cycle 510 is one second (1000 ms), the on portion 520 lasting N milliseconds results in an off portion 530 of 1000-N milliseconds. Depending on desired functionality, different embodiments may have different cycle lengths and/or different values for N. According to some embodiments, when operating in a normal operational state, the GNSS receiver may keep components always powered on (e.g., where the on portion 520 is equal to the length of the cycle 510, and there is no off portion 530). When operating in a reduced operational state, the GNSS receiver may then operate in a manner similar to that shown, where each cycle 510 includes an off portion 530. Additionally or alternatively, a GNSS receiver may duty cycle components in a normal operational state (e.g., having a cycle 510 with an on portion 520 and an off portion 530), but may adjust the duty cycle such that the off portion 530 comprises a larger portion of the cycle 510 when operating in a reduced operational state. Ultimately, a reduced operational state may comprise duty cycling the power of one or more components such that the on portion 520 of a cycle 510 is reduced relative to a normal operational state.

The value of N may vary, depending on desired functionality. For example, it may be predetermined based on the type of operational state (e.g., a normal operational state versus a reduced operational state). Additionally or alternatively, the value of N maybe based on the type of functionality desired during the reduced operational state. An example of this is illustrated in FIG. 6, described hereafter.

Figure 6:
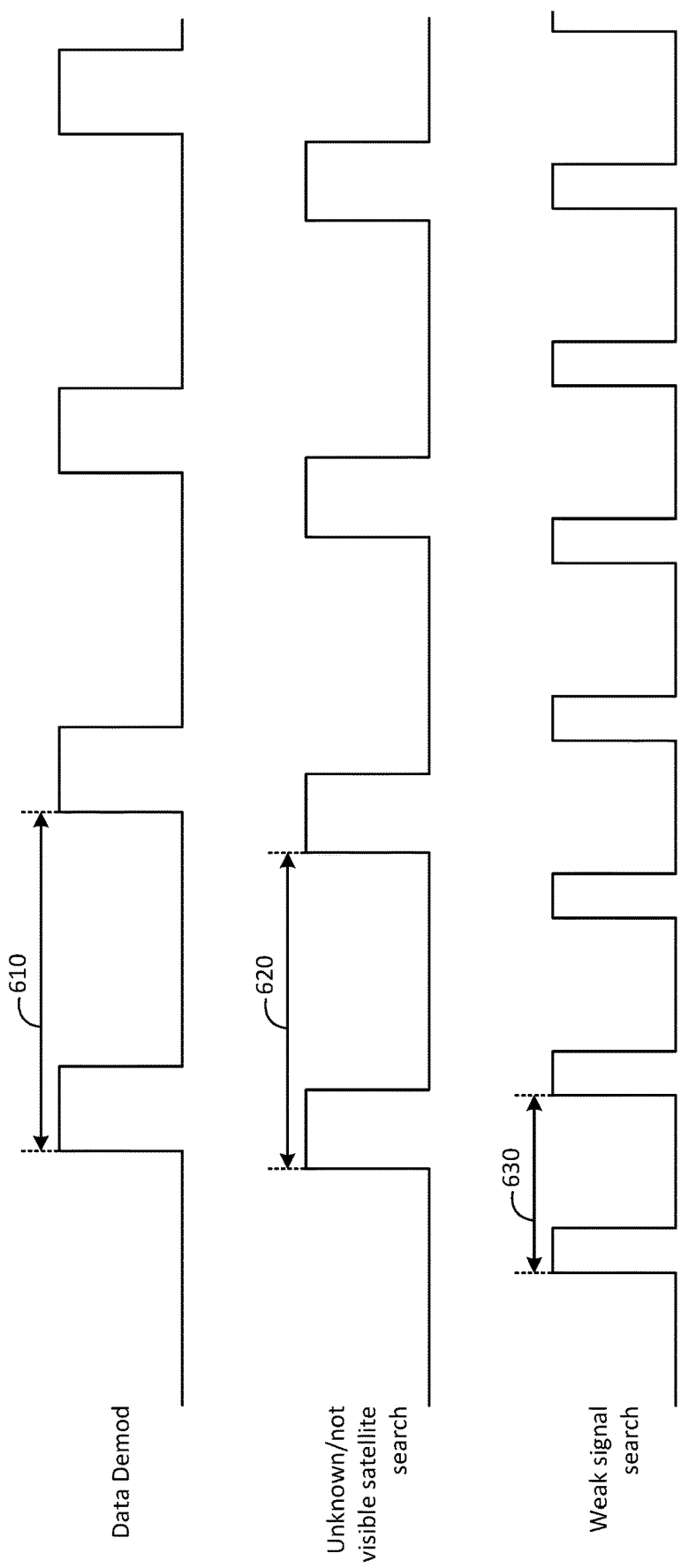
FIG. 6 is a diagram illustrating an example of how multiple features may be duty cycled, according to an embodiment.

FIG. 6 is a diagram illustrating an example of how multiple features may be duty cycled, according to an embodiment. Here, duty cycling is performed on the following functions: data demodulation and decoding, searching for unknown and not visible satellites, and searching for weak signals (e.g., increasing non-coherent integration to a standard operational state). The on portion of each duty cycle may correspond with a time period during which components for processing a signal in a GNSS band that is likely being spoofed are powered on, and the off portion of each duty cycle may correspond with a time period during which one or more of the components for processing the signal is powered off or operated at a lower-power state (relative to operation during the on portion of the duty cycle). Additionally or alternatively, because GNSS processing may be performed using one or more software functions, the on portion of each duty cycle may correspond with a time period during which one or more software components for processing a signal in a GNSS band that is likely being spoofed are disabled, and the off portion of each duty cycle may correspond with a time period during which the one or more software components for processing the signal are enabled. Thus, "duty cycling" features as described herein may comprise duty cycling power to hardware components and/or disabling/enabling software components used to provide those features. According to some embodiments, the duty cycling of these and/or other features may be performed for each GNSS band likely being spoofed. Thus, if likely spoofing is determined to be occurring across an entire constellation or multiple constellations, this functionality may be performed for all GNSS bands in the constellation (s).

As can be seen, different functions have different duty cycles. The cycle 610 (periodicity) of data demodulation and decoding, in this example, is longer than the cycle 620 of unknown/not visible satellites searching, which is longer than the cycle 630 of weak signal searching. According to an example, data demodulation and decoding may be enabled every 12.5 minutes, unknown/not visible satellites searching may be enabled every 10 minutes, and weak signal searching may be enabled every five minutes. As previously noted, the length or proportion of the on portion of each duty cycle may vary, depending on desired functionality. Different timers may be used to track different duty cycles (e.g., different timers may be used for cycle 610, cycle 620, and cycle 630), and timers may be executed via hardware and/or software.

According to some embodiments, the duty cycling of power for performing different functions based on different circumstances. For example, if the GNSS receiver is determined to be in a region in which spoofing is known to occur, then data demodulation is duty cycled is indicated in FIG. 6, but other functions may not be duty cycled. However, under other spoofing circumstances, the GNSS receiver may duty cycle the unknown/not visible satellites search and/or week signal search as shown in FIG. 6.

As noted, by periodically performing one or more features of the GNSS receiver by duty cycling the power to one or more components of the GNSS receiver, information can be obtained to help determine whether spoofing is ongoing, while saving GNSS receiver resources and power. According to some embodiments, one or more components of the GNSS receiver may be powered on periodically in the manner illustrated in FIG. 6 to perform a signal power check. That is, front-end components can be used to track signal power, while back-end components (e.g., a digital signal processor) are powered off. Once signal power of a GNSS signal is within a range corresponding to a non-spoofed GNSS signal, then power to back-end components can be restored.

According to some embodiments, the powering on of one or more components of a GNSS receiver may be coordinated with timing signals from other data sources, to help determine whether GNSS timing is accurate. For example, according to some embodiments, data demodulation and decoding may be enabled at a time during which a WAN provides an accurate time reference, enabling the GNSS receiver to compare the WAN timing with the GNSS timing from the demodulated/decoded signals, which can be used to determine whether GNSS spoofing is ongoing.

Figure 7:
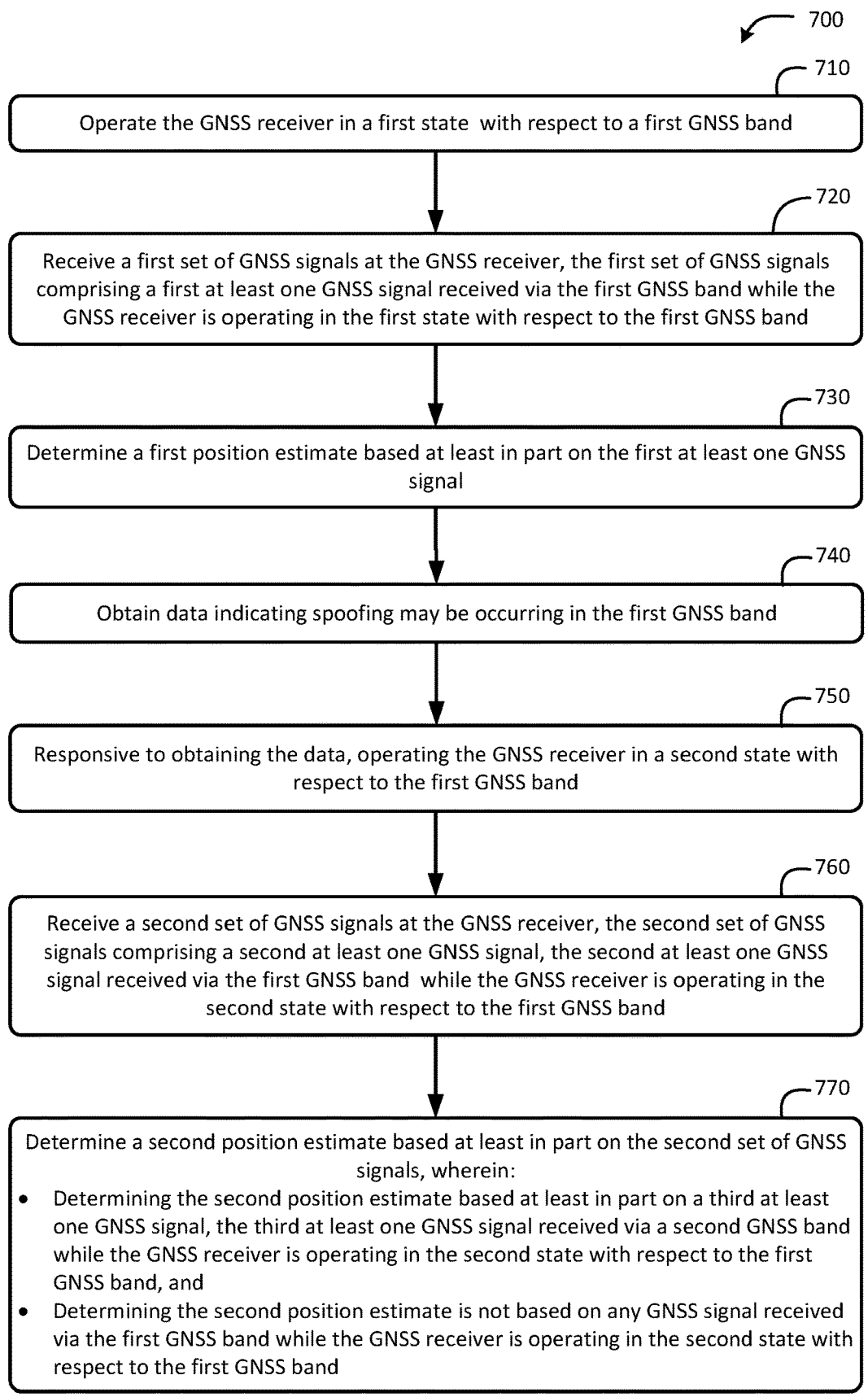
FIG. 7 is a flow diagram of a method of operating a GNSS receiver, according to an embodiment.
Figure 8:
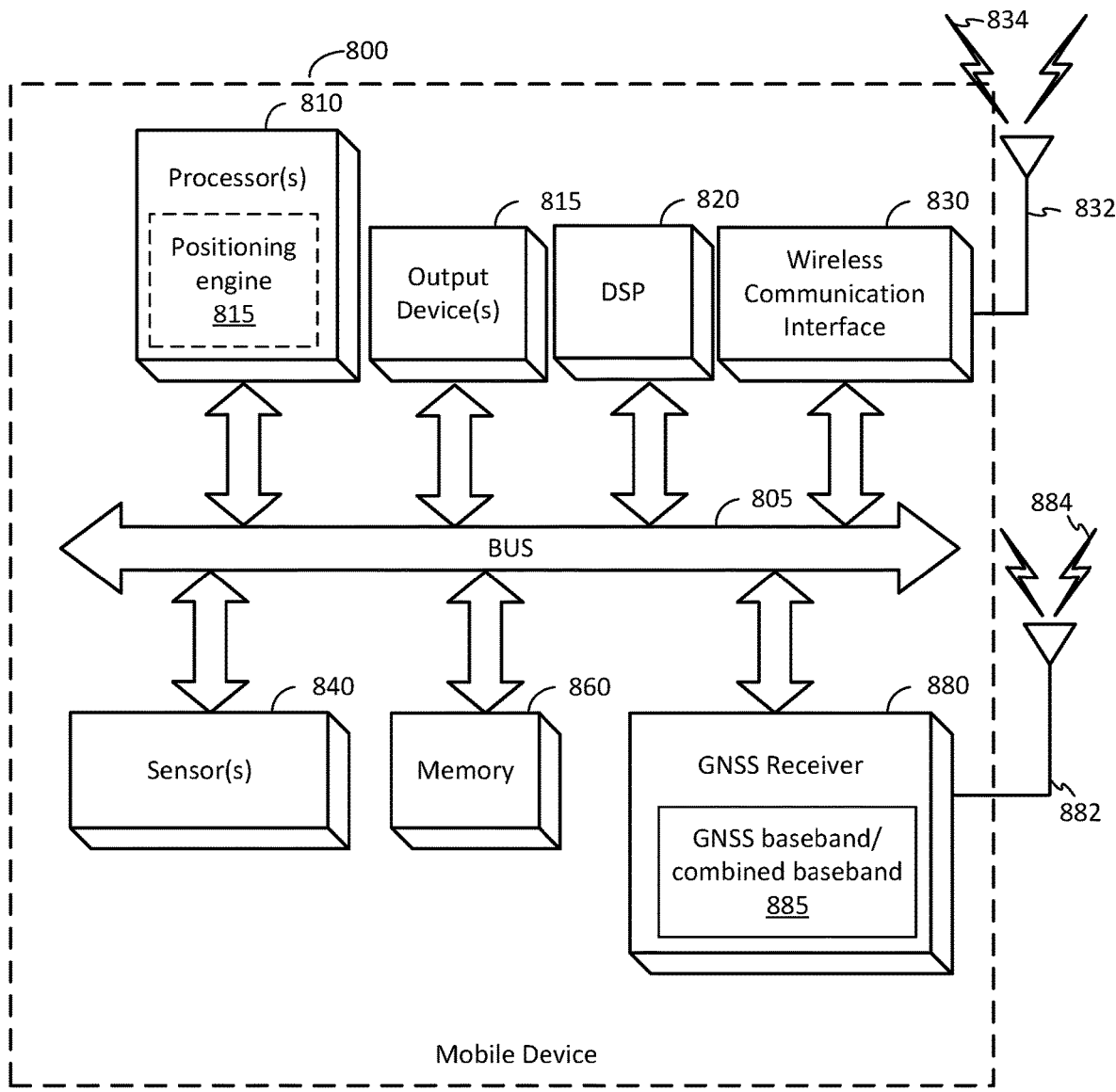
FIG. 8 is a block diagram of an embodiment of a mobile device.

FIG. 7 is a flow diagram of a method 700 of operating a GNSS receiver, according to an embodiment. Means for performing the functionality illustrated in one or more of the blocks shown in FIG. 7 may be performed by hardware and/or software components of a GNSS receiver and/or a mobile device utilizing a GNSS receiver. Example components of a mobile device are illustrated in FIG. 8, which is described in more detail below.

At block 710, the functionality comprises operating the GNSS receiver in a first state with respect to a first GNSS band. Here, the first state may comprise a normal operational state in which, as indicated in subsequent functions of the method 700, GNSS signals received via the first GNSS band are processed and used to determine a position estimate of the GNSS receiver and/or mobile device comprising the GNSS receiver. This can be done, for example, when no spoofing is detected with regard to the first GNSS band, or when a value indicative of likely spoofing is below a threshold. According to some embodiments, the GNSS receiver may be capable of receiving GNSS signals from multiple bands (e.g., the first GNSS band and at least a second GNSS band). This functionality may comprise a capability to receive GNSS signals via multiple constellations. Means for performing functionality at block 710 may comprise processor(s) 810, DSP 820, wireless communication interface 830, sensor(s) 840, memory 860, GNSS receiver 880 and/or other components of a mobile device 800 as illustrated in FIG. 8.

At block 720, the functionality comprises receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band. Here, each GNSS signal may comprise a GNSS signal (e.g., communicating timing and navigation information) received from a GNSS satellite. Because multiple satellites may transmit signals via a GNSS band, the GNSS receiver may receive multiple GNSS signals via the first GNSS band. For the GNSS receiver two determine a 3D position estimate from the first set of GNSS signals, the first set of GNSS signals may comprise signals from at least four GNSS satellites. Means for performing functionality at block 720 may comprise processor(s) 810, DSP 820, wireless communication interface 830, sensor(s) 840, memory 860, GNSS receiver 880 and/or other components of a mobile device 800 as illustrated in FIG. 8.

At block 730, the functionality comprises determining a first position estimate based at least in part on the first at least one GNSS signal. Here, the first position estimate may comprise a GNSS-based position estimate based on the at least one GNSS signal and (optionally) on other GNSS signals received in the first set of GNSS signals. Again, this can include GNSS signals received using GNSS bands and/or GNSS constellations separate from the first GNSS band. The first position estimate may be determined by a positioning engine, which may be executed by the GNSS receiver and/or a processing unit (e.g., within a mobile device) communicatively coupled therewith. Additional details regarding a positioning engine (e.g., positioning engine types, where executed, etc.) are provided elsewhere herein. According to some embodiments, the determined first position estimate may be provided to a mobile device user, another device (e.g., a remote device or server), a processor within the mobile device, an operating system or application within the mobile device, and/or the like. Means for performing functionality at block 730 may comprise processor(s) 810, DSP 820, wireless communication interface 830, sensor(s) 840, memory 860, GNSS receiver 880 and/or other components of a mobile device 800 as illustrated in FIG. 8.

At block 740, the functionality comprises obtaining data indicating spoofing may be occurring in the first GNSS band. The determination of spoofing can be made using any of a variety of spoofing detection techniques. This can include, as noted, comparisons of signals and/or resulting pseudoranges across GNSS bands and/or constellations, comparisons consistency checks with other sensors and/or positioning techniques (e.g., dead reckoning, RAT-based positioning, etc.), and/or the like. Such determination may be performed within the GNSS receiver and/or by other components (e.g., an application processor or a remote device). As such, obtaining data indicating spoofing may be occurring in the first band may comprise receiving the data from a spoofing detection algorithm executed by a process within the GNSS receiver, receiving the data from a separate processor, receiving the data via a wireless communication interface with a separate device (e.g., a remote server), and/or the like. Means for performing functionality at block 740 may comprise processor(s) 810, DSP 820, wireless communication interface 830, sensor(s) 840, memory 860, GNSS receiver 880 and/or other components of a mobile device 800 as illustrated in FIG. 8.

At block 750, the functionality comprises, responsive to obtaining the data, operating the GNSS receiver in a second state with respect to the first GNSS band. Here, the second state may comprise a reduced operational state as detailed in the embodiments described elsewhere herein. Thus, according to some embodiments of the method 700, operating GNSS receiver in the second state with respect to the first GNSS band may comprise disabling data demodulation and decoding of the second at least one GNSS signal. According to some embodiments, disabling data demodulation and decoding may comprise powering down or reducing a clock rate of a digital processor of the GNSS receiver. A digital processor of the GNSS receiver may correspond with processing components used to execute the complex down-conversion and digital baseband 316 of FIG. 3 such components may comprise, for example, GNSS baseband/combined baseband 885 of the GNSS receiver 880 illustrated in FIG. 8 and described hereafter. Additionally or alternatively, processing components may include components within the DSP 820 and/or processor(s) 810.

As noted in the previously described embodiments, operating the GNSS receiver in a reduced operating state may include additional or alternative functionality. According to some embodiments, operating the GNSS receiver in the second state with respect to the first GNSS band may comprise disregarding time data decoded from the second at least one GNSS signal. Additionally or alternatively, operating the GNSS receiver in the second state with respect to the first GNSS band may comprise disabling a satellite detection operation performed by the GNSS receiver to acquire signals from unknown or not visible GNSS satellites. In particular, satellite detection based on the likely-spoofed GNSS band may be disabled. According to some embodiments, operating the GNSS receiver in the second state with respect to the first GNSS band may comprise disabling a satellite differencing operation performed by the GNSS receiver using the second at least one GNSS signal. Additionally or alternatively, operating the GNSS receiver in the second state with respect to the first GNSS band may comprise disabling an error recovery operation performed by the GNSS receiver. According to some embodiments, operating the GNSS receiver in the second state with respect to the first GNSS band may comprise disabling an ISTB operation performed by the GNSS receiver using the second at least one GNSS signal. Additionally or alternatively, operating the GNSS receiver in the second state with respect to the first GNSS band may comprise reducing a non-coherent integration time used by the GNSS receiver to detect the least one GNSS signal received at the GNSS receiver via the first GNSS band. In such embodiments, reducing the non-coherent integration time used by the GNSS receiver may comprise duty cycling power for one or more components used to process the at least one GNSS signal received at the GNSS receiver via the first GNSS band.

Means for performing functionality at block 750 may comprise processor(s) 810, DSP 820, wireless communication interface 830, sensor(s) 840, memory 860, GNSS receiver 880 and/or other components of a mobile device 800 as illustrated in FIG. 8.

At block 760, the functionality comprises receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band. Here, the second set of GNSS signals may comprise signals from the same or different satellites from which the first set of GNSS signals were received. However, unlike the first set of GNSS signals, the GNSS receiver is operating in the second state with respect to the first GNSS band when the second set of GNSS signals are received. As such, one or more of the previously-described techniques for operating the GNSS receiver with respect to the first GNSS band (e.g., disabling data demodulation and decoding, disabling timing, reducing non-coherent integration time etc.) may be performed. Means for performing functionality at block 760 may comprise processor(s) 810, DSP 820, wireless communication interface 830, sensor(s) 840, memory 860, GNSS receiver 880 and/or other components of a mobile device 800 as illustrated in FIG. 8.

At block 770, the functionality comprises determining a second position estimate based at least in part on the second set of GNSS signals, wherein (i) determining the second position estimate based at least in part on a third at least one GNSS signal, the third at least one GNSS signal received via a second GNSS band while the GNSS receiver is operating in the second state with respect to the first GNSS band, and (ii) determining the second position estimate is not based on any GNSS signal received via the first GNSS band while the GNSS receiver is operating in the second state with respect to the first GNSS band. Thus, while the GNSS receiver is operating in the second state with respect to the first GNSS band, the GNSS receiver may continue to perform GNSS-based positioning based on the at least one GNSS signal received via a second GNSS band (and, optionally, one or more signals from one or more other GNSS bands). Moreover, the GNSS receiver may continue to do so until the likely spoofing is no longer occurring (e.g., the likelihood or confidence level that spoofing is occurring falls below a threshold), at which point the GNSS receiver may revert to standard operation with respect to the first GNSS band. As such, some embodiments of the method 700 may further comprise determining spoofing no longer may be occurring in the first GNSS band, and, responsive to determining the spoofing no longer may be occurring, operating the GNSS receiver in the first state with respect to the first GNSS band.

As noted, according to some embodiments, the GNSS receiver may continue to perform "spot checks" of signals received via the first GNSS band to determine whether the likely spoofing of the first GNSS band is ongoing. To do so, the GNSS receiver may duty cycle power to one or more components for processing signals received via the first GNSS band as detailed in the embodiments previously described. As such, according to some embodiments of the method 700, the method may further comprise for a period of time during which spoofing may be occurring, cycling between operating the GNSS receiver in the second state with respect to the first GNSS band for a first predetermined period of time and operating the GNSS receiver in the first state with respect to the first GNSS band for a second predetermined period of time. This can help the GNSS receiver to determine whether the likely spoofing is still occurring using spoofing detection techniques such as consistency checks, outlier detection, etc.

Means for performing functionality at block 770 may comprise processor(s) 810, DSP 820, wireless communication interface 830, sensor(s) 840, memory 860, GNSS receiver 880 and/or other components of a mobile device 800 as illustrated in FIG. 8.

FIG. 8 is a block diagram of an embodiment of a mobile device 800, which can be utilized as described in the embodiments described herein and in association with FIGS. 1-7. For example, the mobile device 800 can perform one or more of the functions of method 700 of FIG. 7. Further, the mobile device 800 may correspond with a UE as described herein (e.g., UE 105 of FIG. 1). It should be noted that FIG. 8 is meant only to provide a generalized illustration of various components of mobile device 800, any or all of which may be utilized as appropriate. In other words, because UEs can vary widely in functionality, they may include only a portion of the components shown in FIG. 8. It can be noted that, in some instances, components illustrated by FIG. 8 can be localized to a single physical device and/or distributed among various networked devices, which may be disposed at different physical locations.

The mobile device 800 is shown comprising hardware elements that can be electrically coupled via a bus 805 (or may otherwise be in communication, as appropriate). The hardware elements may include one or more processors 810 which may comprise without limitation one or more general-purpose processors, one or more special-purpose processors (such as digital signal processing (DSP) chips, graphics acceleration processors, application specific integrated circuits (ASICs), and/or the like), and/or other processing structures, units, or means, which can be configured to perform one or more of the methods described herein. As shown in FIG. 8, some embodiments may have a separate DSP 820, depending on desired functionality. The mobile device 800 also may comprise one or more input devices 870, which may comprise without limitation one or more touch screens, touch pads, microphones, buttons, dials, switches, and/or the like; and one or more output devices 815, which may comprise without limitation, one or more displays, light emitting diodes (LEDs), speakers, and/or the like.

The mobile device 800 might also include a wireless communication interface 830, which may comprise without limitation a modem, a network card, an infrared communication device, a wireless communication device, and/or a chipset (such as a Bluetooth® device, an IEEE 802.11 device, an IEEE 802.15.4 device, a Wi-Fi device, a WiMAX™ device, cellular communication facilities, etc.), and/or the like, which may enable the mobile device 800 to communicate via the networks described herein with regard to FIG. 1. The wireless communication interface 830 may permit data to be communicated with a network, base stations (e.g., eNBs, ng-eNBs, and/or gNBs), and/or other network components, computer systems, transmission/reception points (TRPs), and/or any other electronic devices described herein. The communication can be carried out via one or more wireless communication antenna(s) 832 that send and/or receive wireless signals 834. According to some embodiments, the wireless communication antenna(s) 832 may comprise a plurality of discrete antennas, antenna arrays, or any combination thereof. The antenna(s) 832 may be capable of transmitting and receiving wireless signals using beams (e.g., Tx beams and Rx beams). Beam formation may be performed using digital and/or analog beam formation techniques, with respective digital and/or analog circuitry. The wireless communication interface 830 may include such circuitry.

Depending on desired functionality, the wireless communication interface 830 may comprise a separate receiver and transmitter, or any combination of transceivers, transmitters, and/or receivers to communicate with base stations (e.g., ng-eNBs and gNBs) and other terrestrial transceivers, such as wireless devices and access points. The mobile device 800 may communicate with different data networks that may comprise various network types. As previously noted, a WWAN may be a CDMA network, a TDMA network, a FDMA network, an OFDMA network, a SC-FDMA network, a WiMAX (IEEE 802.16), and so on. 5G, LTE, LTE Advanced, NR, GSM, and WCDMA are described in documents from 3GPP. Again, a WLAN may also be an IEEE 802.11x network, and a WPAN may be a Bluetooth network, an IEEE 802.15x, or some other type of network.

The mobile device 800 can further include sensor(s) 840. Such sensors may comprise, without limitation, one or more inertial sensors, radar, LIDAR, sonar, accelerometer(s), gyroscope(s), and or other Inertial Measurement Units (IMUs)), camera(s) 848, magnetometer(s), compass, altimeter(s), microphone(s), proximity sensor(s), light sensor(s), barometer, and the like, some of which may be used to complement and/or facilitate the position estimation functionality described herein.

Embodiments of the mobile device 800 may also include a GNSS receiver 880 capable of receiving signals 884 from one or more GNSS satellites via one or more GNSS bands using a GNSS antenna 882 (which may be combined in some implementations with an antenna(s) 832). To do so, the GNSS receiver 880 may comprise the signal processing architecture 300 of FIG. 3 and/or similar processing components. As previously noted, the signal processing architecture 300 may be used to process signals received from a single GNSS band or two GNSS bands having similar baseband frequencies. As such, the GNSS receiver 880 may comprise many signal processing architectures similar to the signal processing architecture 300 of FIG. 3 to be capable of processing signals received via many GNSS bands/constellations. In some embodiments, the GNSS receiver 880 may include front-end analog components for each GNSS band (or for pairs of GNSS bands having similar baseband frequencies), and may share digital circuitry (e.g., complex down-conversion and digital baseband 316) among multiple GNSS bands. Additionally or alternatively, digital circuitry may be separate for each GNSS band.

The GNSS receiver 880 can extract a position of the mobile device 800, using conventional techniques, from GNSS satellites of a GNSS system, such as GPS, Galileo, LONASS, Compass, Quasi-Zenith Satellite System (QZSS) over Japan, Indian Regional Navigational Satellite System (IRNSS) over India, Beidou over China, and/or the like. Moreover, the GNSS receiver 880 can use various augmentation systems (e.g., a Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein a GNSS may include any combination of one or more global and/or regional navigation satellite systems and/or augmentation systems, and GNSS signals may include GNSS, GNSS-like, and/or other signals associated with such one or more GNSS.

It can be noted that, although GNSS receiver 880 is illustrated in FIG. 8 as a distinct component, embodiments are not so limited. As used herein, the term "GNSS receiver" may comprise hardware and/or software components configured to obtain GNSS measurements (measurements from GNSS satellites). In some embodiments, therefore, the GNSS receiver may comprise a measurement engine executed (as software) by one or more processors, such as processor(s) 810, DSP 820, and/or a processor within the wireless communication interface 830 (e.g., in a modem). A GNSS receiver may optionally also include a positioning engine, which can use GNSS measurements from the measurement engine to determine a position of the GNSS receiver using an Extended Kalman Filter (EKF), Weighted Least Squares (WLS), a hatch filter, particle filter, or the like. The positioning engine may also be executed by one or more processors, such as processor(s) 810 or DSP 820.

The mobile device 800 may further include and/or be in communication with a memory 860. The memory 860 may comprise, without limitation, local and/or network accessible storage, a disk drive, a drive array, an optical storage device, a solid-state storage device, such as a random access memory (RAM), and/or a read-only memory (ROM), which can be programmable, flash-updateable, and/or the like. Such storage devices may be configured to implement any appropriate data stores, including without limitation, various file systems, database structures, and/or the like.

The memory 860 of the mobile device 800 also can comprise software elements (not shown), including an operating system, device drivers, executable libraries, and/or other code, such as one or more application programs, which may comprise computer programs provided by various embodiments, and/or may be designed to implement methods, and/or configure systems, provided by other embodiments, as described herein. Merely by way of example, one or more procedures described with respect to the functionality discussed above might be implemented as code and/or instructions executable by the mobile device 800 (e.g., using processor(s) 810). In an aspect, then, such code and/or instructions can be used to configure and/or adapt a general-purpose computer (or other device) to perform one or more operations in accordance with the described methods.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" as used herein, refer to any storage medium that participates in providing data that causes a machine to operate in a specific fashion. In embodiments provided hereinabove, various machine-readable media might be involved in providing instructions/code to processors and/or other device(s) for execution. Additionally or alternatively, the machine-readable media might be used to store and/or carry such instructions/code. In many implementations, a computer-readable medium is a physical and/or tangible storage medium. Such a medium may take many forms, including but not limited to, non-volatile media, volatile media, and transmission media. Common forms of computer-readable media include, for example, magnetic and/or optical media, any other physical medium with patterns of holes, a RAM, a PROM, EPROM, a FLASH-EPROM, any other memory chip or cartridge, a carrier wave as described hereinafter, or any other medium from which a computer can read instructions and/or code.

The methods, systems, and devices discussed herein are examples. Various embodiments may omit, substitute, or add various procedures or components as appropriate. For instance, features described with respect to certain embodiments may be combined in various other embodiments. Different aspects and elements of the embodiments may be combined in a similar manner. The various components of the figures provided herein can be embodied in hardware and/or software. Also, technology evolves and, thus, many of the elements are examples that do not limit the scope of the disclosure to those specific examples.

It has proven convenient at times, principally for reasons of common usage, to refer to such signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and" and "or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AA, AAB, AABBCCC, etc.

Having described several embodiments, various modifications, alternative constructions, and equivalents may be used without departing from the spirit of the disclosure. For example, the above elements may merely be a component of a larger system, wherein other rules may take precedence over or otherwise modify the application of the various embodiments. Also, a number of steps may be undertaken before, during, or after the above elements are considered. Accordingly, the above description does not limit the scope of the disclosure.

In view of this description embodiments may include different combinations of features. Implementation examples are described in the following numbered clauses:

Clause 1. A method for operating a Global Navigation Satellite System (GNSS) receiver, the method comprising: operating the GNSS receiver in a first state with respect to a first GNSS band; receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band; determining a first position estimate based at least in part on the first at least one GNSS signal; obtaining data indicating spoofing may be occurring in the first GNSS band; responsive to obtaining the data, operating the GNSS receiver in a second state with respect to the first GNSS band; receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band; and determining a second position estimate based at least in part on the second set of GNSS signals, wherein: determining the second position estimate based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

Clause 2. The method of clause 1, wherein operating the GNSS receiver in the second state with respect to the first GNSS band comprises disabling data demodulation and decoding of the second at least one GNSS signal.

Clause 3. The method of clause 2 wherein disabling data demodulation and decoding comprises powering down or reducing a clock rate of a digital processor of the GNSS receiver.

Clause 4. The method of any of clauses 1-3 wherein operating the GNSS receiver in the second state with respect to the first GNSS band comprises disregarding time data decoded from the second at least one GNSS signal.

Clause 5. The method of any of clauses 1-4 wherein operating the GNSS receiver in the second state with respect to the first GNSS band comprises disabling a satellite detection operation performed by the GNSS receiver to acquire signals from unknown or not visible GNSS satellites.

Clause 6. The method of any of clauses 1-5 wherein operating the GNSS receiver in the second state with respect to the first GNSS band comprises disabling a satellite differencing operation performed by the GNSS receiver using the second at least one GNSS signal.

Clause 7. The method of any of clauses 1-6 wherein operating the GNSS receiver in the second state with respect to the first GNSS band comprises disabling an error recovery operation performed by the GNSS receiver.

Clause 8. The method of any of clauses 1-7 wherein operating the GNSS receiver in the second state with respect to the first GNSS band comprises disabling an Inter-Signal Time Bias (ISTB) operation performed by the GNSS receiver using the second at least one GNSS signal.

Clause 9. The method of any of clauses 1-8 wherein operating the GNSS receiver in the second state with respect to the first GNSS band comprises reducing a non-coherent integration time used by the GNSS receiver to detect the second at least one GNSS signal.

Clause 10. The method of any clause 9 wherein reducing the non-coherent integration time used by the GNSS receiver comprises duty cycling power for one or more components used to process the second at least one GNSS signal.

Clause 11. The method of any of clauses 1-10 further comprising determining spoofing no longer may be occurring in the first GNSS band; and responsive to determining the spoofing no longer may be occurring, operating the GNSS receiver in the first state with respect to the first GNSS band.

Clause 12. The method of any of clauses 1-11 further comprising for a period of time during which spoofing may be occurring, cycling between operating the GNSS receiver in the second state with respect to the first GNSS band for a first predetermined period of time and operating the GNSS receiver in the first state with respect to the first GNSS band for a second predetermined period of time.

Clause 13. A device for operating a Global Navigation Satellite System (GNSS) receiver, the device comprising: a transceiver; a memory; and one or more processors communicatively coupled with the transceiver and the memory, wherein the one or more processors are configured to: operate the GNSS receiver in a first state with respect to a first GNSS band; receive a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band; determine a first position estimate based at least in part on the first at least one GNSS signal; obtain data indicating spoofing may be occurring in the first GNSS band; responsive to obtaining the data, operating the GNSS receiver in a second state with respect to the first GNSS band; receive a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band; and determine a second position estimate based at least in part on the second set of GNSS signals, wherein: determine the second position estimate based at least in part on a third at least one GNSS signal, the third at least one GNSS signal received via a second GNSS band while the GNSS receiver is operating in the second state with respect to the first GNSS band, and determine the second position estimate is not based on any GNSS signal received via the first GNSS band while the GNSS receiver is operating in the second state with respect to the first GNSS band.

Clause 14. The device of clause 13, wherein the one or more processors, when operating the GNSS receiver in the second state with respect to the first GNSS band, are configured to disable data demodulation and decoding of the second at least one GNSS signal.

Clause 15. The device of any of clause 14 wherein the one or more processors, when disabling data demodulation and decoding, are configured to power down or reducing a clock rate of a digital processor of the GNSS receiver.

Clause 16. The device of any of clauses 13-15 wherein the one or more processors, when operating the GNSS receiver in the second state with respect to the first GNSS band, are configured to disregard time data decoded from the second at least one GNSS signal.

Clause 17. The device of any of clauses 13-16 wherein the one or more processors, when operating the GNSS receiver in the second state with respect to the first GNSS band, are configured to disable a satellite detection operation performed by the GNSS receiver to acquire signals from unknown or not visible GNSS satellites.

Clause 18. The device of any of clauses 13-17 wherein the one or more processors, when operating the GNSS receiver in the second state with respect to the first GNSS band, are configured to disable a satellite differencing operation performed by the GNSS receiver using the second at least one GNSS signal.

Clause 19. The device of any of clauses 13-18 wherein the one or more processors, when operating the GNSS receiver in the second state with respect to the first GNSS band, are configured to disable an error recovery operation performed by the GNSS receiver.

Clause 20. The device of any of clauses 13-19 wherein the one or more processors, when operating the GNSS receiver in the second state with respect to the first GNSS band, are configured to disable an Inter-Signal Time Bias (ISTB) operation performed by the GNSS receiver using the second at least one GNSS signal.

Clause 21. The device of any of clauses 13-20 wherein the one or more processors, when operating the GNSS receiver in the second state with respect to the first GNSS band, are configured to reduce a non-coherent integration time used by the GNSS receiver to detect the second at least one GNSS signal.

Clause 22. The device of any clause 21 wherein the one or more processors, when reducing the non-coherent integration time used by the GNSS receiver, are configured to duty cycling power for one or more components used to process the second at least one GNSS signal.

Clause 23. The device of any of clauses 13-22 wherein the one or more processors are further configured to: determine spoofing no longer may be occurring in the first GNSS band; and responsive to determining the spoofing no longer may be occurring, operating the GNSS receiver in the first state with respect to the first GNSS band.

Clause 24. The device of any of clauses 13-23 wherein the one or more processors are further configured to: for a period of time during which spoofing may be occurring, cycling between operating the GNSS receiver in the second state with respect to the first GNSS band for a first predetermined period of time and operating the GNSS receiver in the first state with respect to the first GNSS band for a second predetermined period of time.

Clause 25. An apparatus for operating a Global Navigation Satellite System (GNSS) receiver, the apparatus comprising: means for operating the GNSS receiver in a first state with respect to a first GNSS band; means for receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band; means for determining a first position estimate based at least in part on the first at least one GNSS signal; means for obtaining data indicating spoofing may be occurring in the first GNSS band; means for responsive to obtaining the data, operating the GNSS receiver in a second state with respect to the first GNSS band; means for receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band; and means for determining a second position estimate based at least in part on the second set of GNSS signals, wherein: means for determining the second position estimate based at least in part on a third at least one GNSS signal, the third at least one GNSS signal received via a second GNSS band while the GNSS receiver is operating in the second state with respect to the first GNSS band, and means for determining the second position estimate is not based on any GNSS signal received via the first GNSS band while the GNSS receiver is operating in the second state with respect to the first GNSS band.

Clause 26. The apparatus of clause 25, wherein the means for operating the GNSS receiver in the second state with respect to the first GNSS band comprises means for disabling data demodulation and decoding of the second at least one GNSS signal.

Clause 27. A non-transitory computer-readable medium storing instructions for operating a Global Navigation Satellite System (GNSS) receiver, the instructions comprising code for: operating the GNSS receiver in a first state with respect to a first GNSS band; receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band; determining a first position estimate based at least in part on the first at least one GNSS signal; obtaining data indicating spoofing may be occurring in the first GNSS band; responsive to obtaining the data, operating the GNSS receiver in a second state with respect to the first GNSS band; receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band; and determining a second position estimate based at least in part on the second set of GNSS signals, wherein: determining the second position estimate based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band.

Clause 28. The computer-readable medium of clause 27, wherein the code for operating the GNSS receiver in the second state with respect to the first GNSS band comprises code for disabling data demodulation and decoding of the second at least one GNSS signal.

What is claimed is:

1. A method for operating a Global Navigation Satellite System (GNSS) receiver, the method comprising:
    operating the GNSS receiver in a first state with respect to a first GNSS band;
    receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band;
    determining a first position estimate based at least in part on the first at least one GNSS signal;
    determining spoofing may be occurring in the first GNSS band;
    responsive to determining spoofing may be occurring, operating the GNSS receiver in a second state with respect to the first GNSS band;
    receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band;
    determining a second position estimate based at least in part on the second set of GNSS signals, wherein:
        determining the second position estimate is based at least in part on a third at least one GNSS signal, the third at least one GNSS signal received via a second GNSS band while the GNSS receiver is operating in the second state with respect to the first GNSS band, and
        determining the second position estimate is not based on any GNSS signal received via the first GNSS band while the GNSS receiver is operating in the second state with respect to the first GNSS band;
    determining spoofing no longer may be occurring in the first GNSS band; and
    responsive to determining the spoofing no longer may be occurring, operating the GNSS receiver in the first state with respect to the first GNSS band.

2. The method of claim 1, wherein operating the GNSS receiver in the second state with respect to the first GNSS band comprises disabling data demodulation and decoding of the second at least one GNSS signal.

3. The method of claim 2, wherein disabling data demodulation and decoding comprises powering down or reducing a clock rate of a digital processor of the GNSS receiver.

4. The method of claim 1, wherein operating the GNSS receiver in the second state with respect to the first GNSS band comprises disregarding time data decoded from the second at least one GNSS signal.

5. The method of claim 1, wherein operating the GNSS receiver in the second state with respect to the first GNSS band comprises disabling a satellite detection operation performed by the GNSS receiver to acquire signals from unknown or not visible GNSS satellites.

6. The method of claim 1, wherein operating the GNSS receiver in the second state with respect to the first GNSS band comprises disabling a satellite differencing operation performed by the GNSS receiver using the second at least one GNSS signal.

7. The method of claim 1, wherein operating the GNSS receiver in the second state with respect to the first GNSS band comprises disabling an error recovery operation performed by the GNSS receiver.

8. The method of claim 1, wherein operating the GNSS receiver in the second state with respect to the first GNSS band comprises disabling an Inter-Signal Time Bias (ISTB) operation performed by the GNSS receiver using the second at least one GNSS signal.

9. The method of claim 1, wherein operating the GNSS receiver in the second state with respect to the first GNSS band comprises reducing a non-coherent integration time used by the GNSS receiver to detect the second at least one GNSS signal.

10. The method of claim 9, wherein reducing the non-coherent integration time used by the GNSS receiver comprises duty cycling power for one or more components used to process the second at least one GNSS signal.

11. The method of claim 1, further comprising:
for a period of time during which spoofing may be occurring, cycling between operating the GNSS receiver in the second state with respect to the first GNSS band for a first predetermined period of time and operating the GNSS receiver in the first state with respect to the first GNSS band for a second predetermined period of time.

12. A device for operating a Global Navigation Satellite System (GNSS) receiver, the device comprising:
the GNSS receiver;
a memory; and
one or more processors communicatively coupled with the GNSS receiver and the memory, wherein the one or more processors are configured to:
operate the GNSS receiver in a first state with respect to a first GNSS band;
receive a first set of GNSS signals via the GNSS receiver, the first set of GNSS signals comprising a first at least one GNSS signal, the first at least one GNSS signal received via the first GNSS band while the GNSS receiver is operating in the first state with respect to the first GNSS band;
determine a first position estimate based at least in part on the first at least one GNSS signal;
determine spoofing may be occurring in the first GNSS band;
responsive to determining spoofing may be occurring, operate the GNSS receiver in a second state with respect to the first GNSS band;
receive a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band;
determine a second position estimate based at least in part on the second set of GNSS signals, wherein:
determining the second position estimate is based at least in part on a third at least one GNSS signal, the third at least one GNSS signal received via a second GNSS band while the GNSS receiver is operating in the second state with respect to the first GNSS band, and
determining the second position estimate is not based on any GNSS signal received via the first GNSS band while the GNSS receiver is operating in the second state with respect to the first GNSS band;
determine spoofing no longer may be occurring in the first GNSS band; and
responsive to determining the spoofing no longer may be occurring, operating the GNSS receiver in the first state with respect to the first GNSS band.

13. The device of claim 12, wherein, to operate the GNSS receiver in the second state with respect to the first GNSS band, the one or more processors are configured to disable data demodulation and decoding of the second at least one GNSS signal.

14. The device of claim 13, wherein, to disable data demodulation and decoding, the one or more processors are configured to power down or reducing a clock rate of a digital processor of the GNSS receiver.

15. The device of claim 12, wherein, to operate the GNSS receiver in the second state with respect to the first GNSS band, the one or more processors are configured to disregard time data decoded from the second at least one GNSS signal.

16. The device of claim 12, wherein, to operate the GNSS receiver in the second state with respect to the first GNSS band, the one or more processors are configured to disable a satellite detection operation performed by the GNSS receiver to acquire signals from unknown or not visible GNSS satellites.

17. The device of claim 12, wherein, to operate the GNSS receiver in the second state with respect to the first GNSS band, the one or more processors are configured to disable a satellite differencing operation performed by the GNSS receiver using the second at least one GNSS signal.

18. The device of claim 12, wherein, to operate the GNSS receiver in the second state with respect to the first GNSS band, the one or more processors are configured to disable an error recovery operation performed by the GNSS receiver.

19. The device of claim 12, wherein, to operate the GNSS receiver in the second state with respect to the first GNSS band, the one or more processors are configured to disable an Inter-Signal Time Bias (ISTB) operation performed by the GNSS receiver using the second at least one GNSS signal.

20. The device of claim 12, wherein, to operate the GNSS receiver in the second state with respect to the first GNSS band, the one or more processors are configured to reduce a non-coherent integration time used by the GNSS receiver to detect the second at least one GNSS signal.

21. The device of claim 20, wherein, to reduce the non-coherent integration time used by the GNSS receiver, the one or more processors are configured to duty cycle power for one or more components used to process the second at least one GNSS signal.

22. The device of claim 12, wherein the one or more processors are further configured to, for a period of time during which spoofing may be occurring, cycle between operating the GNSS receiver in the second state with respect to the first GNSS band for a first predetermined period of time and operating the GNSS receiver in the first state with respect to the first GNSS band for a second predetermined period of time.

23. An apparatus for operating a Global Navigation Satellite System (GNSS) receiver, the apparatus comprising:
means for operating the GNSS receiver in a first state with respect to a first GNSS band;
means for receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band;
means for determining a first position estimate based at least in part on the first at least one GNSS signal;
means for determining spoofing may be occurring in the first GNSS band;
means for operating the GNSS receiver in a second state with respect to the first GNSS band responsive to determining spoofing may be occurring;
means for receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band; and
means for determining a second position estimate based at least in part on the second set of GNSS signals, wherein:

determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band, and wherein the means for operating the GNSS receiver in the second state with respect to the first GNSS band comprises means for disabling data demodulation and decoding of the second at least one GNSS signal.

24. A non-transitory computer-readable medium storing instructions for operating a Global Navigation Satellite System (GNSS) receiver, the instructions comprising code for:

operating the GNSS receiver in a first state with respect to a first GNSS band;

receiving a first set of GNSS signals at the GNSS receiver, the first set of GNSS signals comprising a first at least one GNSS signal, the first at least one GNSS signal received via the first GNSS band while the GNSS receiver is operating in the first state with respect to the first GNSS band;

determining a first position estimate based at least in part on the first at least one GNSS signal;

determining spoofing may be occurring in the first GNSS band;

responsive to determining spoofing may be occurring, operating the GNSS receiver in a second state with respect to the first GNSS band;

receiving a second set of GNSS signals at the GNSS receiver, the second set of GNSS signals comprising a second at least one GNSS signal, the second at least one GNSS signal received via the first GNSS band while the GNSS receiver is operating in the second state with respect to the first GNSS band;

determining a second position estimate based at least in part on the second set of GNSS signals, wherein:

determining the second position estimate is based at least in part on a third at least one GNSS signal, the third at least one GNSS signal received via a second GNSS band while the GNSS receiver is operating in the second state with respect to the first GNSS band, and determining the second position estimate is not based on any GNSS signal received via the first GNSS band while the GNSS receiver is operating in the second state with respect to the first GNSS band;

determining spoofing no longer may be occurring in the first GNSS band; and responsive to determining the spoofing no longer may be occurring, operating the GNSS receiver in the first state with respect to the first GNSS band.

* * * * *